F. ASHWORTH.
SEWING MACHINE.
APPLICATION FILED OCT. 3, 1910.
1,169,909.
Patented Feb. 1, 1916.
14 SHEETS—SHEET 7.
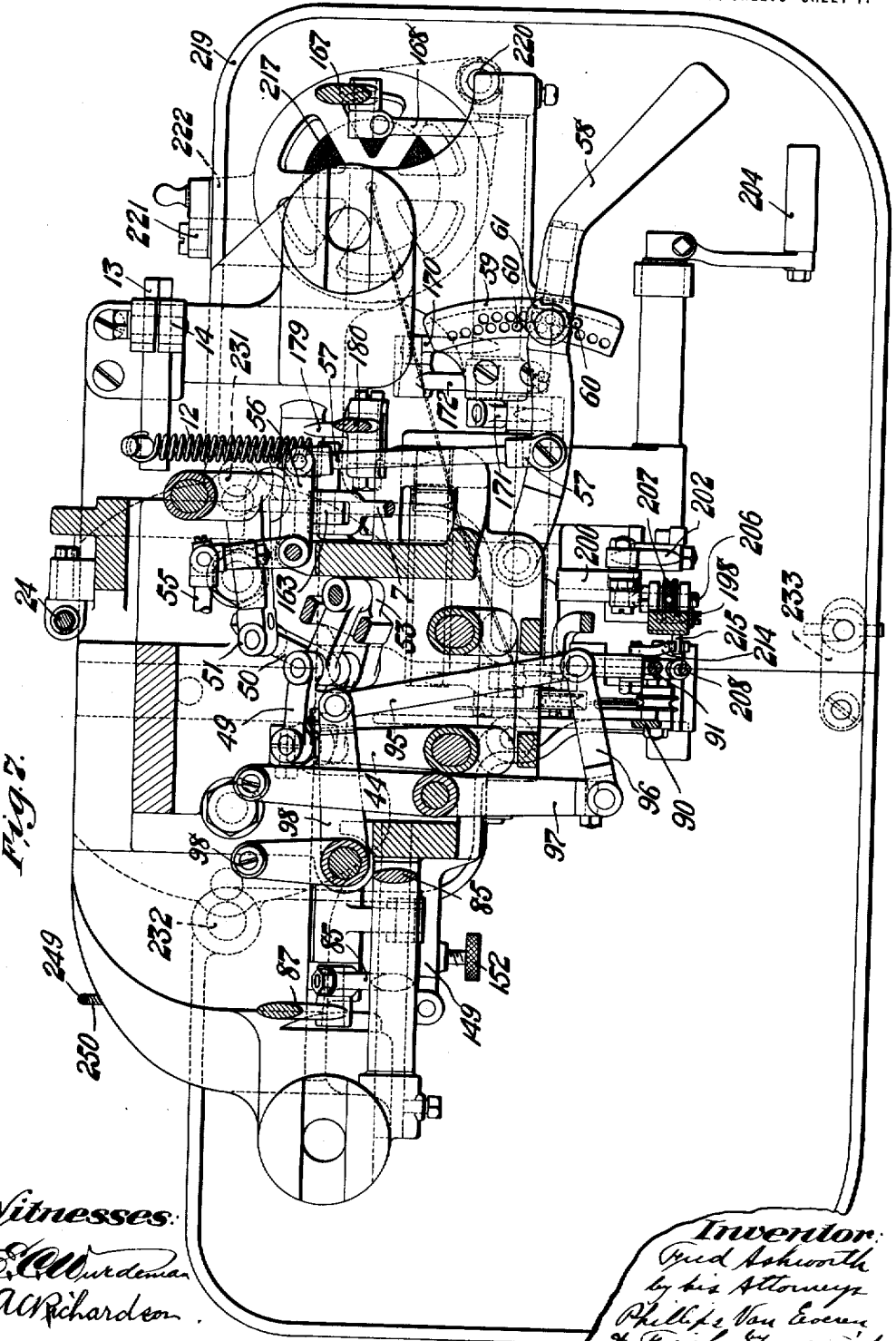

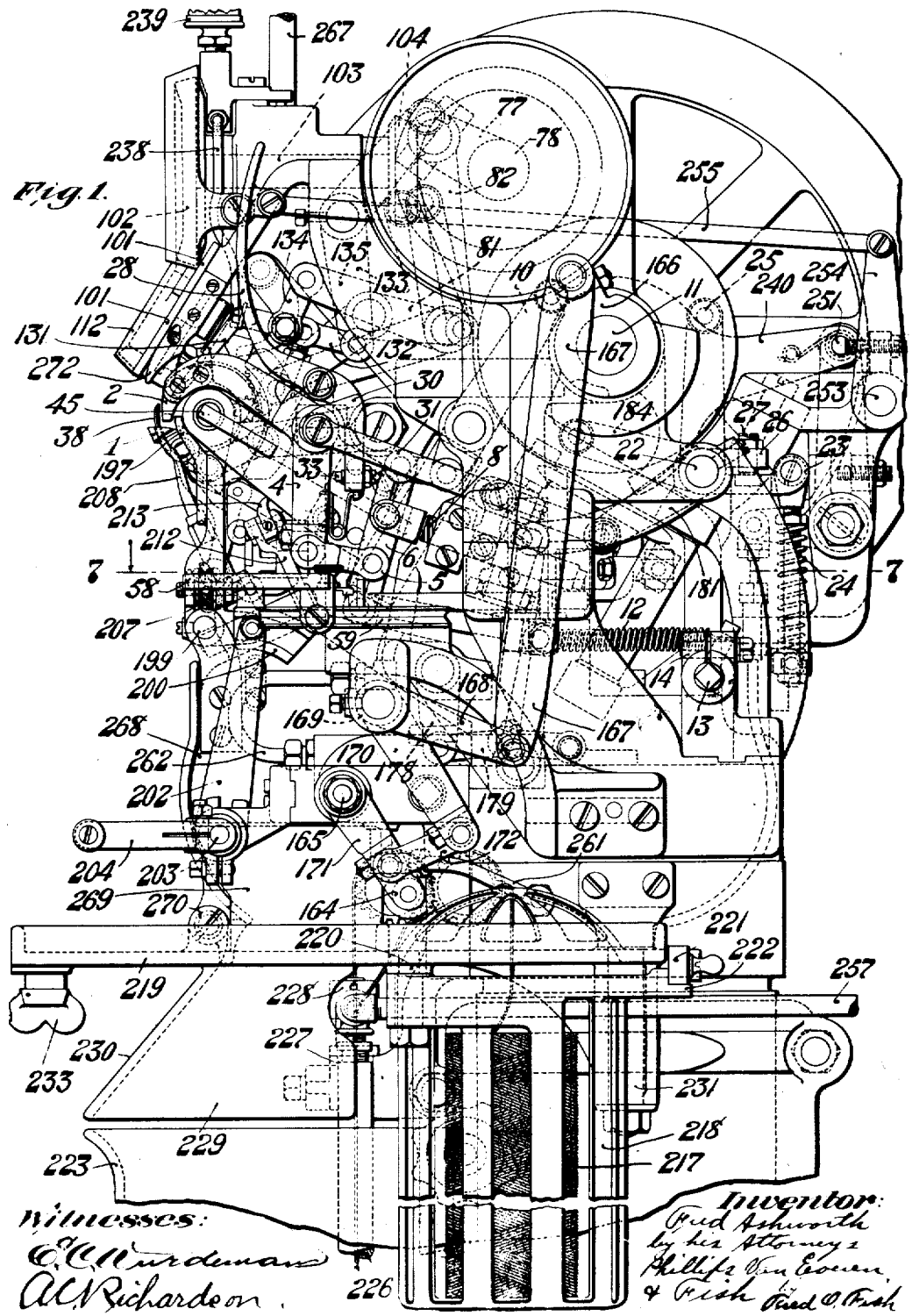

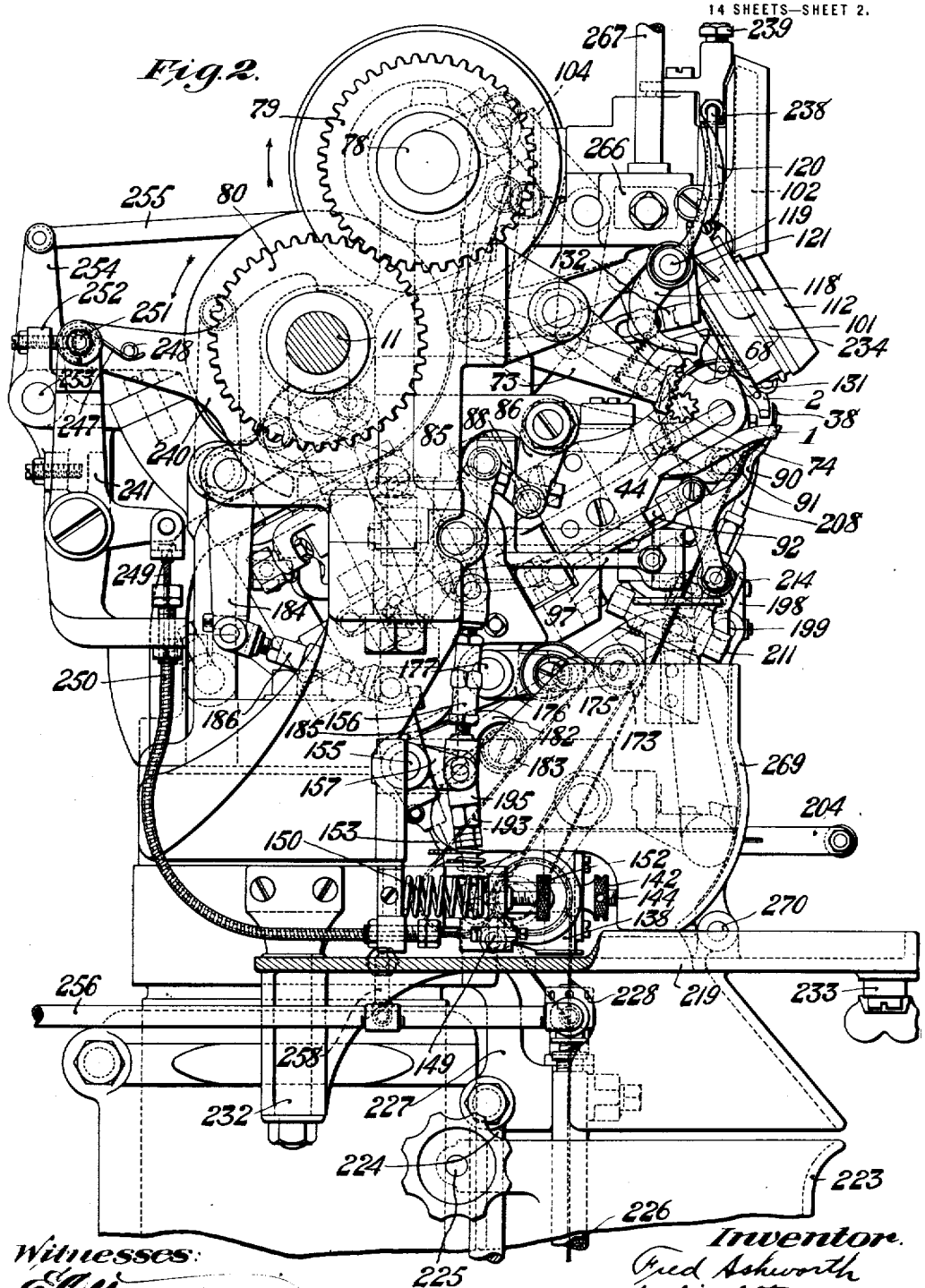

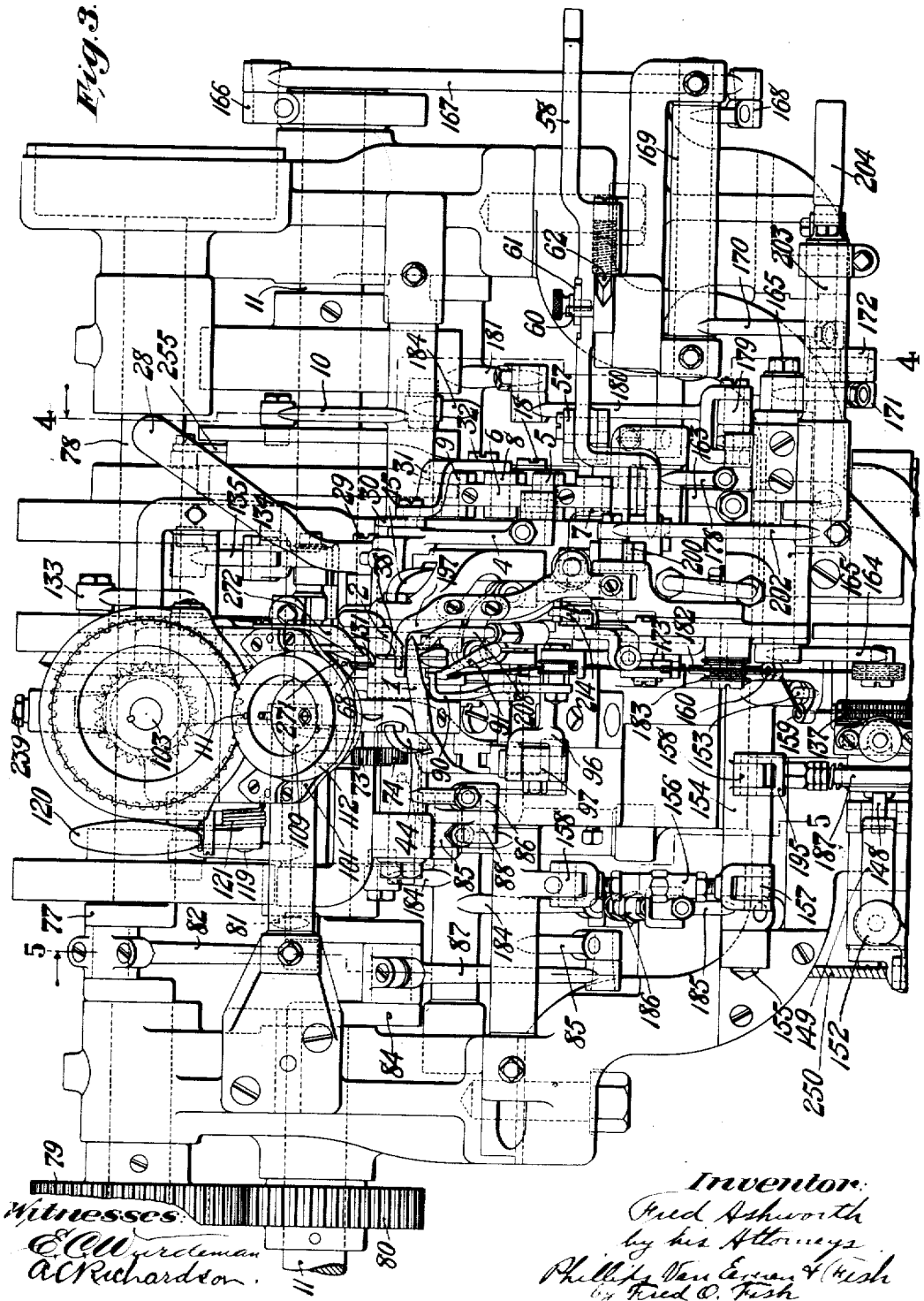

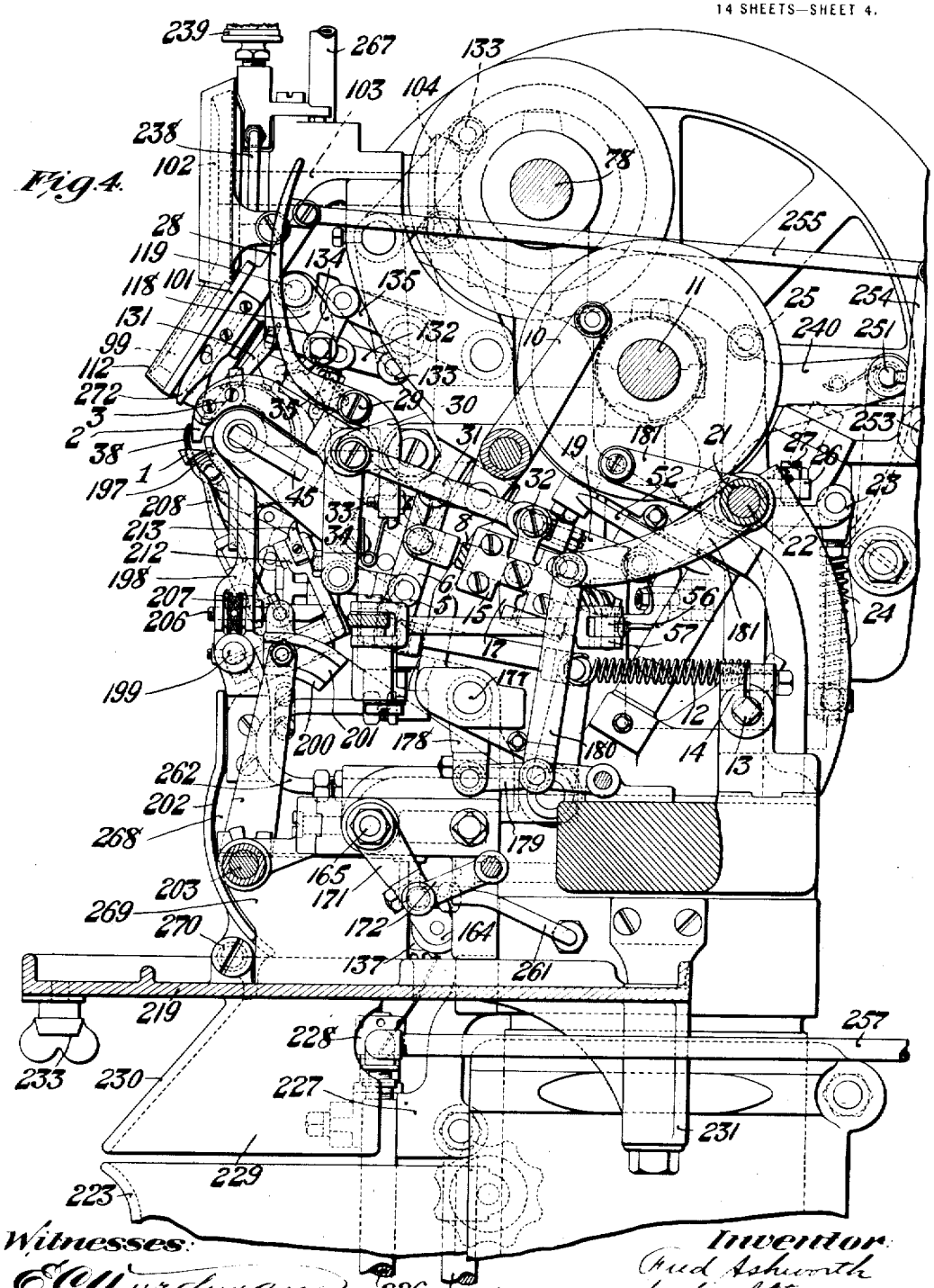

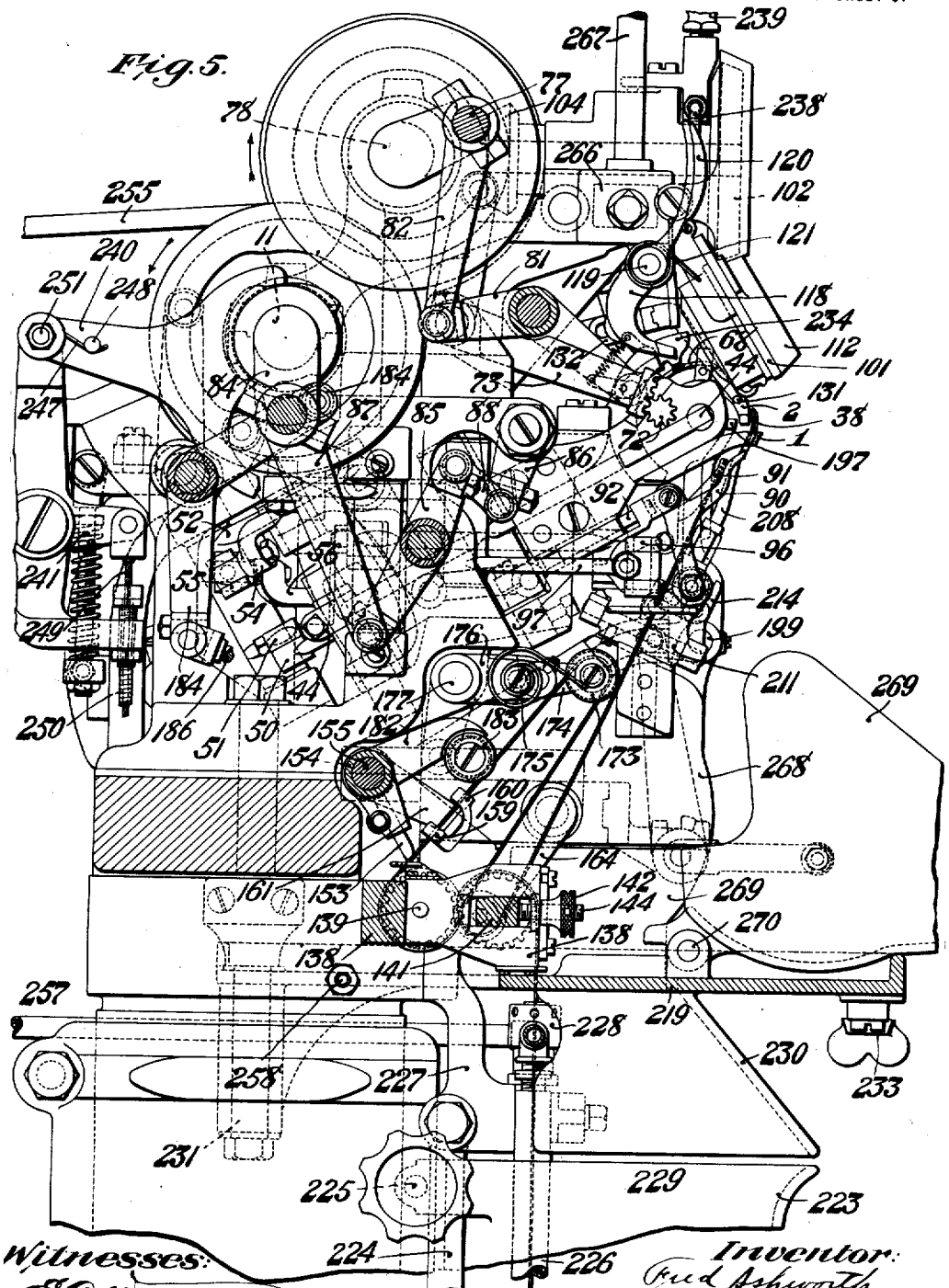

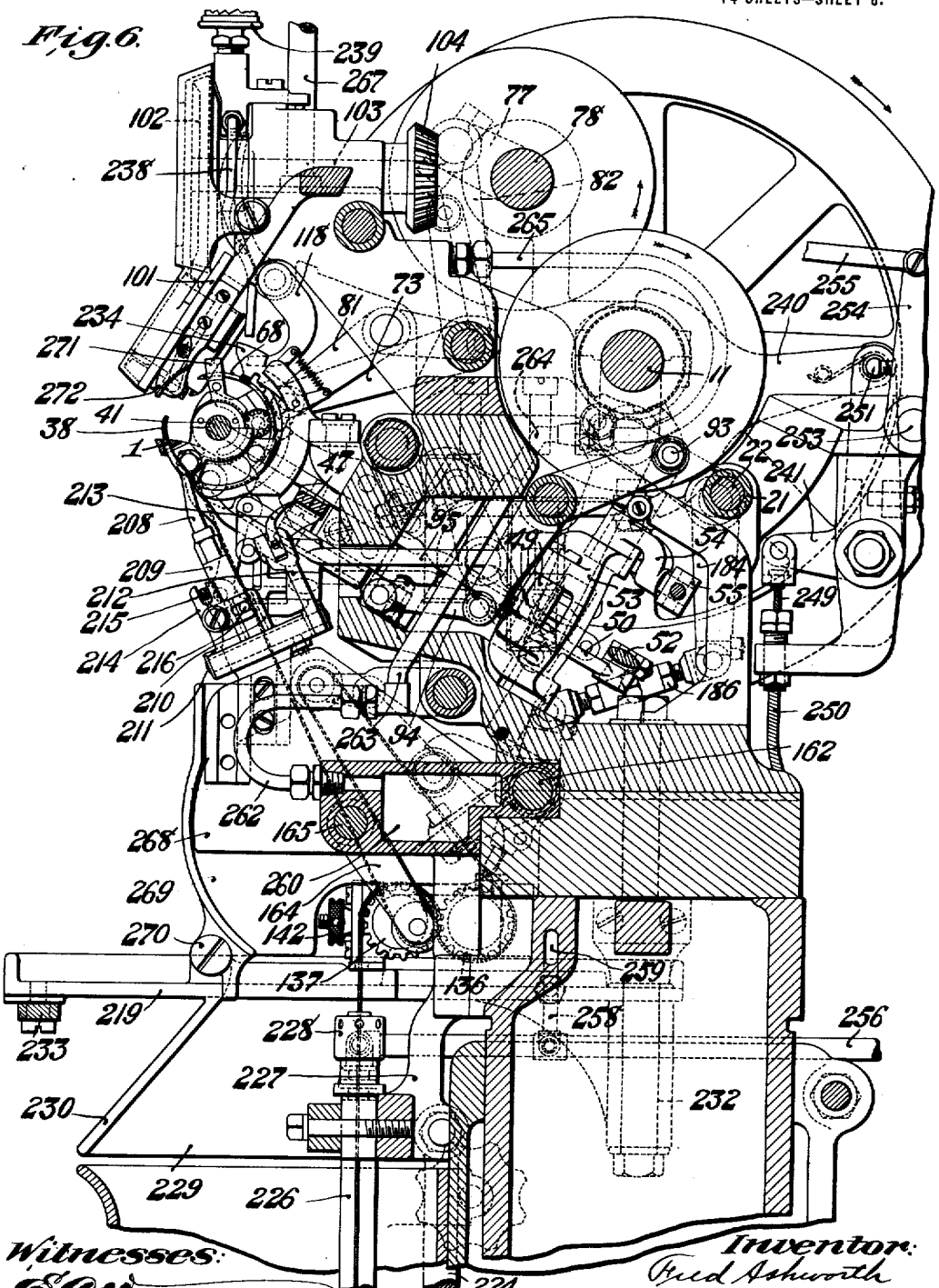

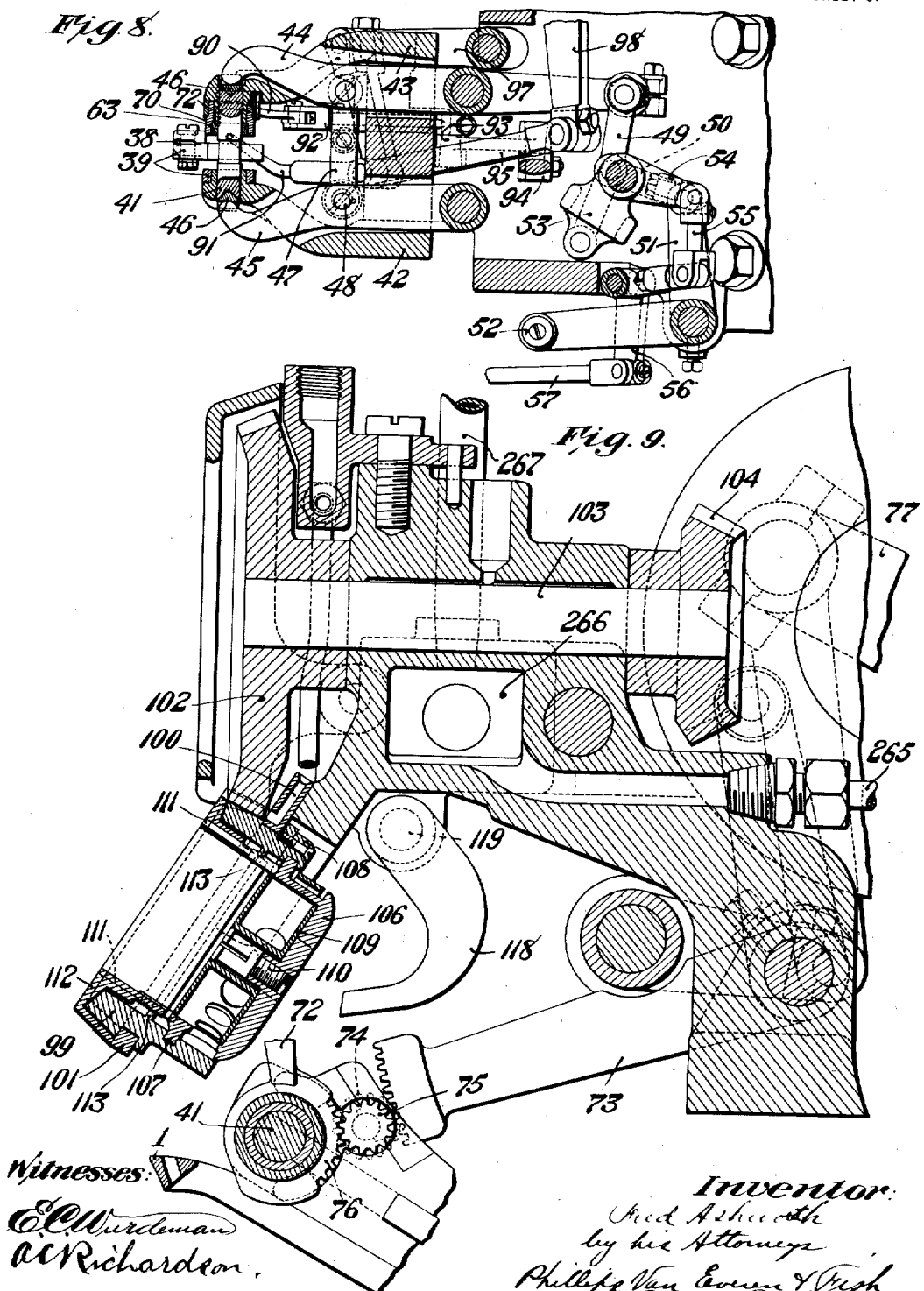

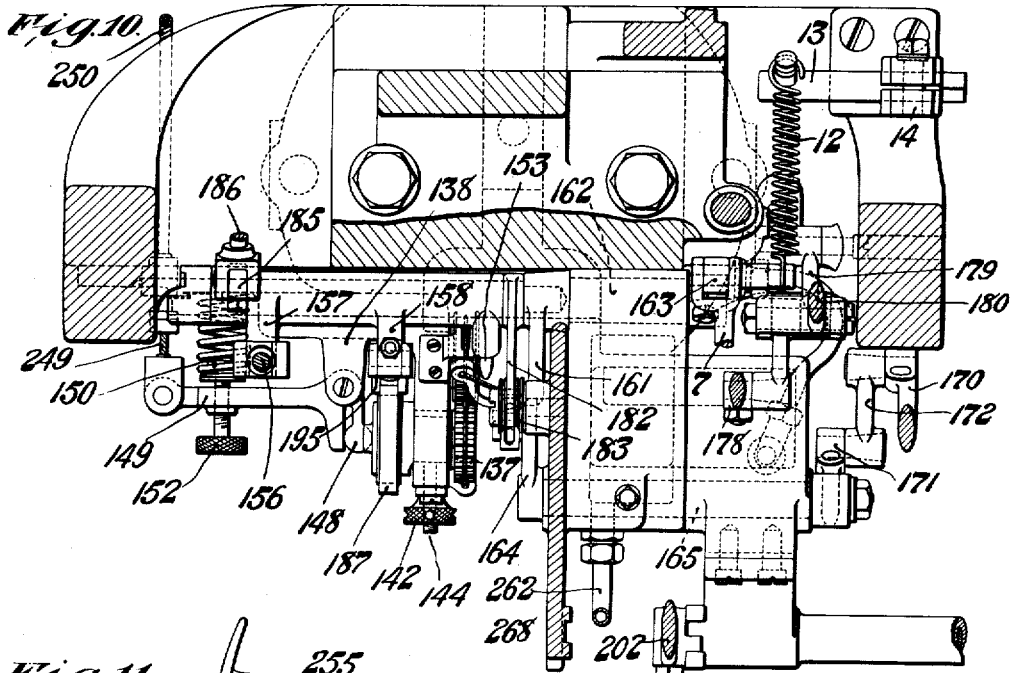
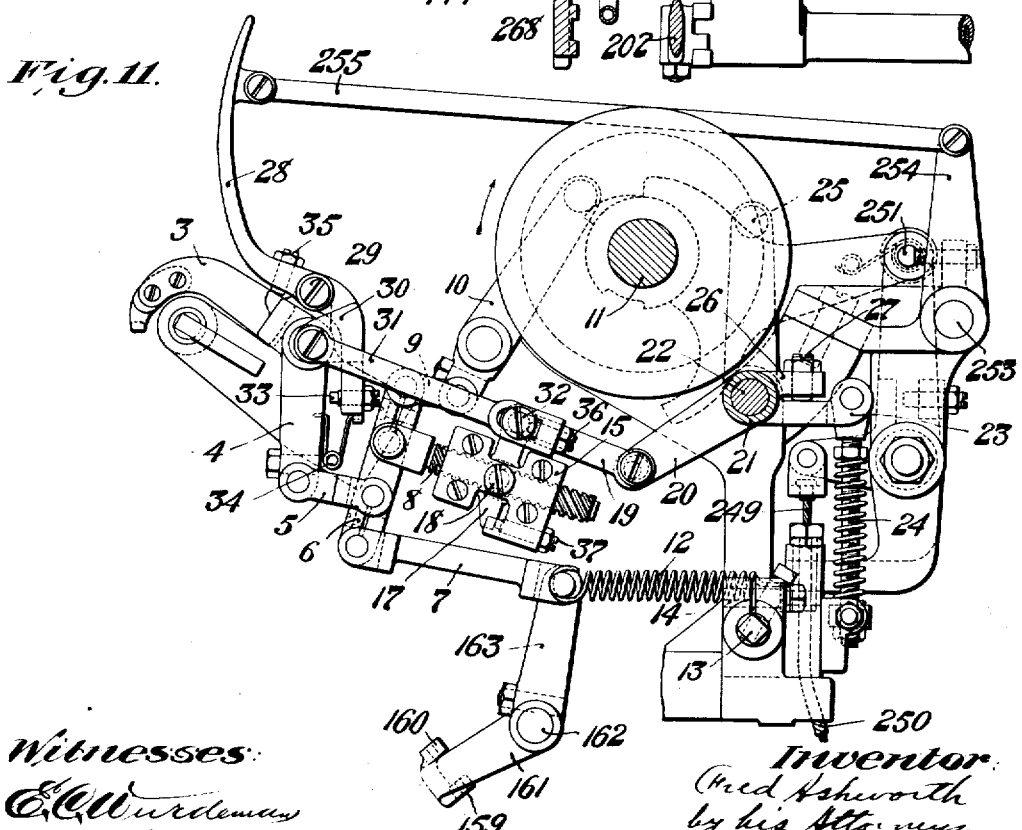

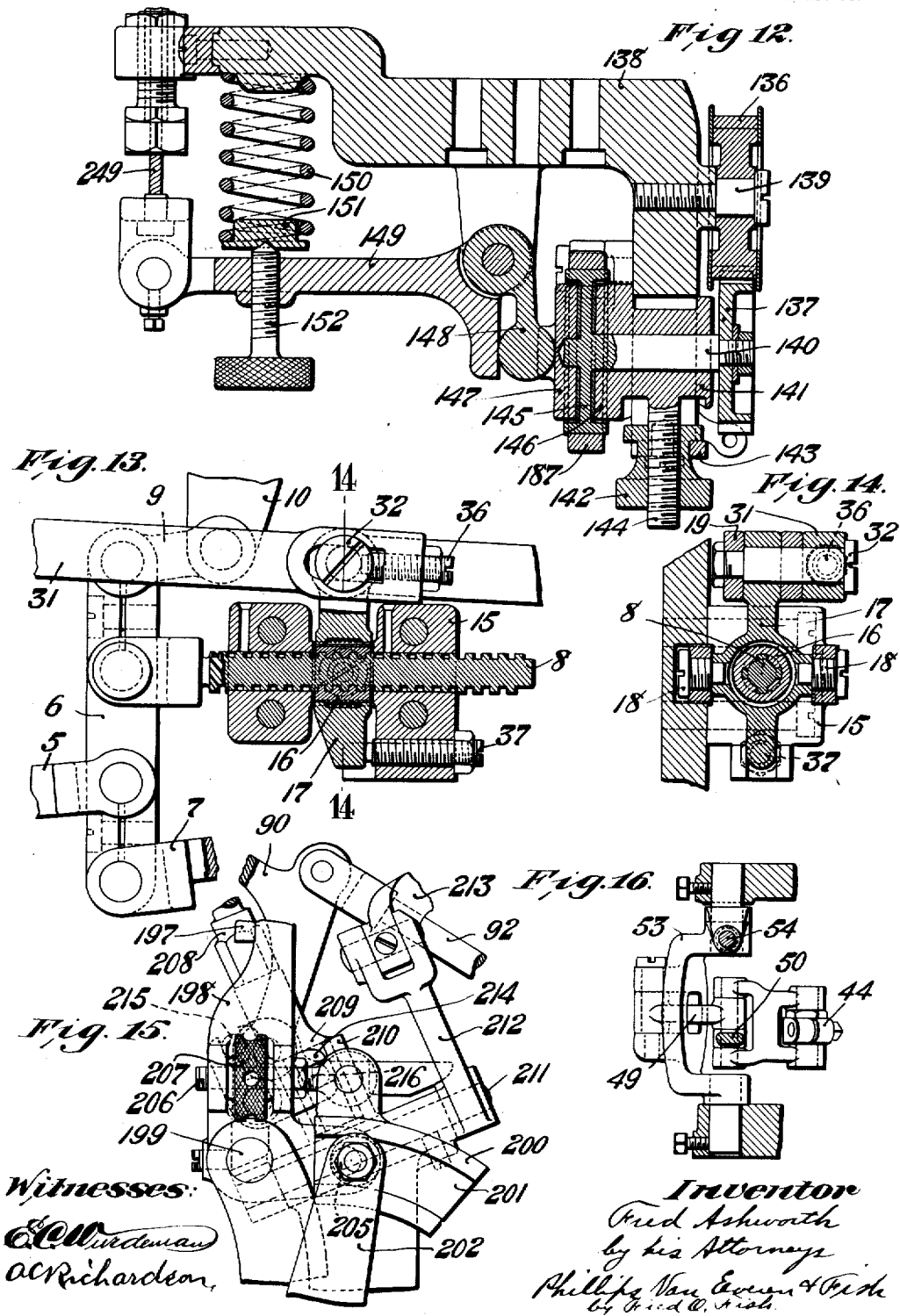

F. ASHWORTH.
SEWING MACHINE.
APPLICATION FILED OCT. 3, 1910.

1,169,909.

Patented Feb. 1, 1916.
14 SHEETS—SHEET 11.

Witness
E. C. Wurdeman

Inventor:
Fred Ashworth
by his Attorneys
Phillips Van Everen & Fish
by Fred O. Fish

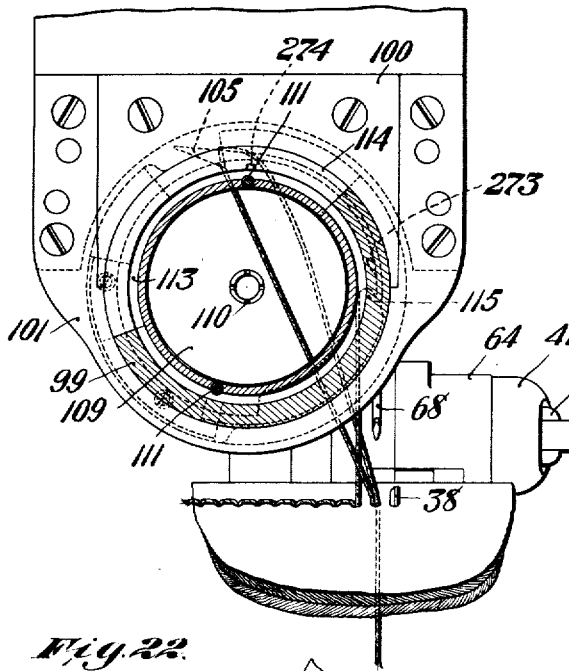
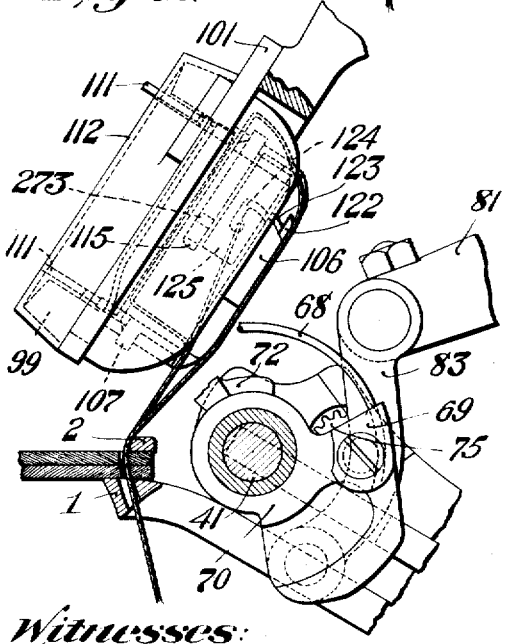
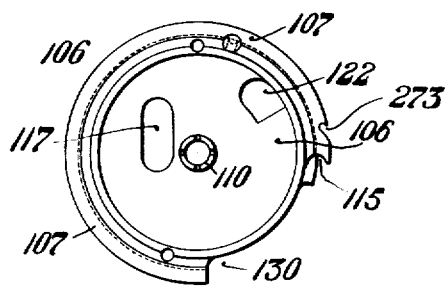
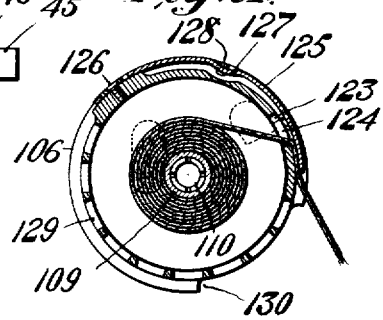
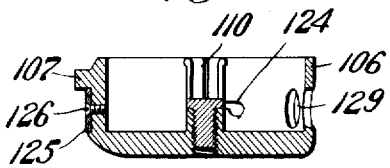
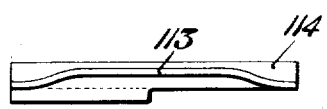

F. ASHWORTH.
SEWING MACHINE.
APPLICATION FILED OCT. 3, 1910.
1,169,909.
Patented Feb. 1, 1916.
14 SHEETS—SHEET 13.
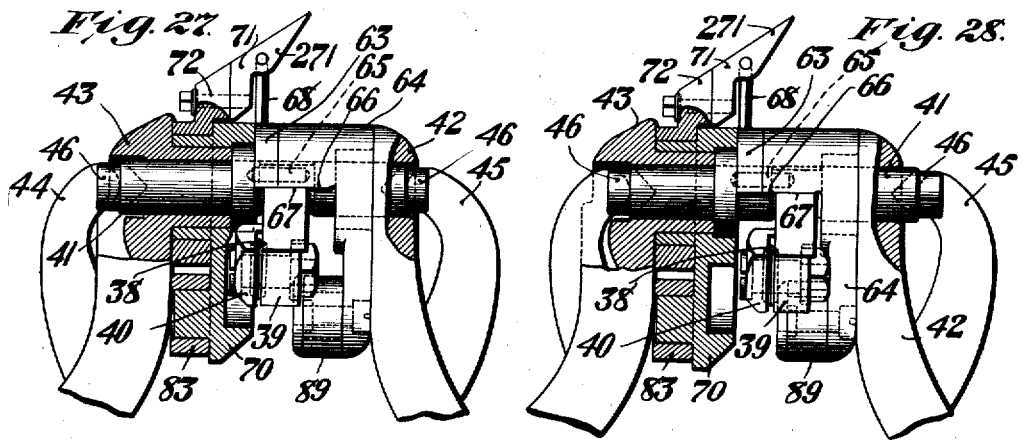
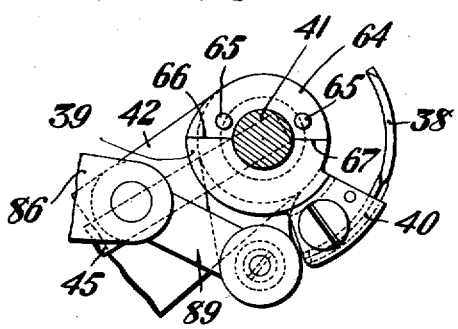
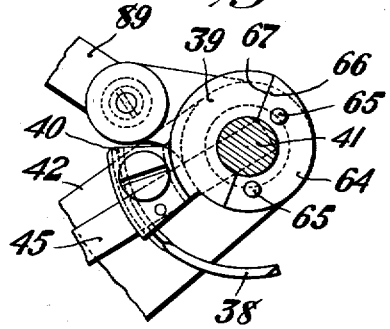
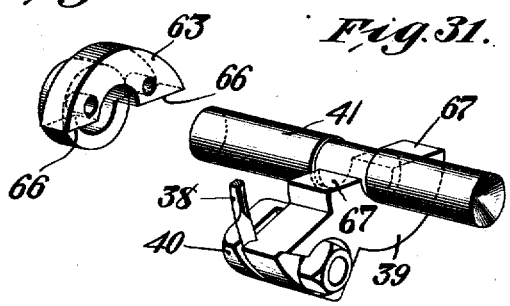
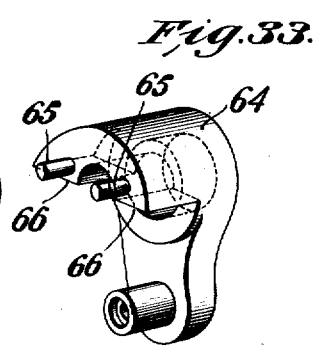
Witnesses:
E. C. Wurdeman
A. C. Richardson
Inventor
Fred Ashworth
by his Attorneys
Phillips Van Everen & Fish
by Fred O. Fish

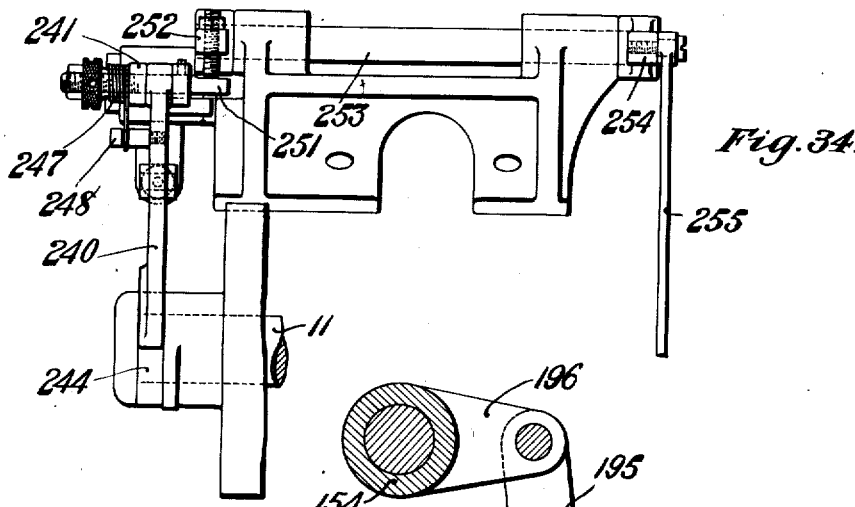
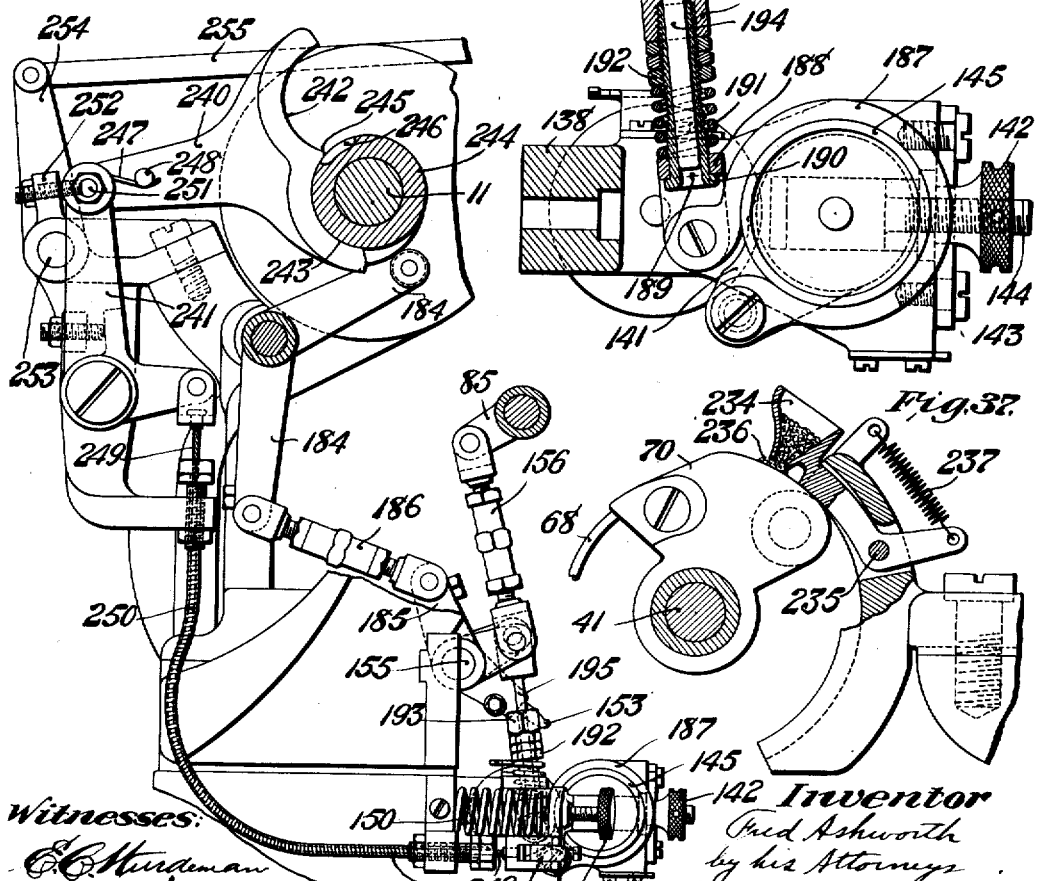

UNITED STATES PATENT OFFICE.

FRED ASHWORTH, OF BEVERLY, MASSACHUSETTS, ASSIGNOR TO UNITED SHOE MACHINERY COMPANY, OF PATERSON, NEW JERSEY, A CORPORATION OF NEW JERSEY.

SEWING-MACHINE.

1,169,909.   Specification of Letters Patent.   Patented Feb. 1, 1916.

Application filed October 3, 1910. Serial No. 585,116.

*To all whom it may concern:*

Be it known that I, FRED ASHWORTH, a citizen of the United States, residing at Beverly, in the county of Essex and State of Massachusetts, have invented certain new and useful Improvements in Sewing-Machines; and I do hereby declare the following to be a full, clear, and exact description of the invention, such as will enable others skilled in the art to which it appertains to make and use the same.

The present invention relates to wax thread sewing machines and more particularly to lock stitch outsole shoe sewing machines which employ a curved awl and a curved hook needle.

The object of the present invention is to produce a machine of the class referred to having its various parts constructed and arranged to operate in an improved manner so that the machine can be run at a high rate of speed without objectionable vibration, and without excessive wear on the parts or liability of breakage and so that the machine can produce as good, and in some respects, better work than the machines of the prior art.

The several features of the present invention will be clearly understood from an inspection of the accompanying drawings in which—

Figure 17:
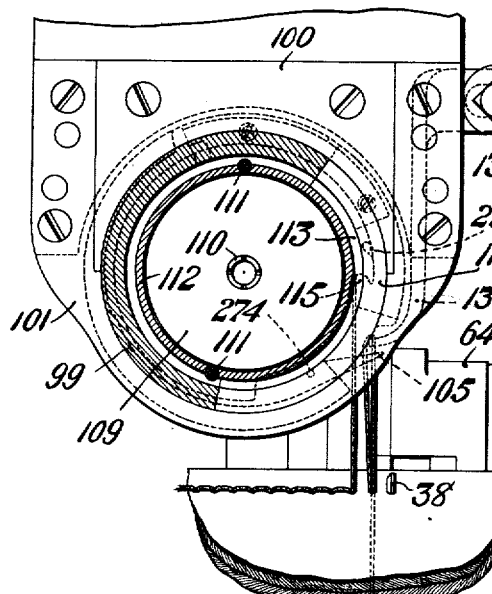
Figure 19:
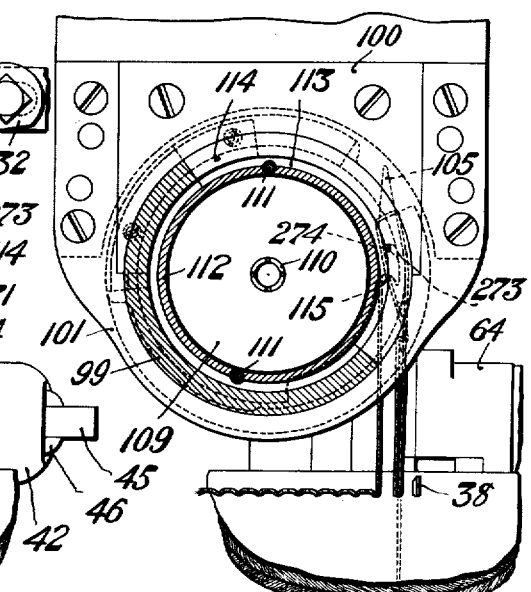
Figure 18:
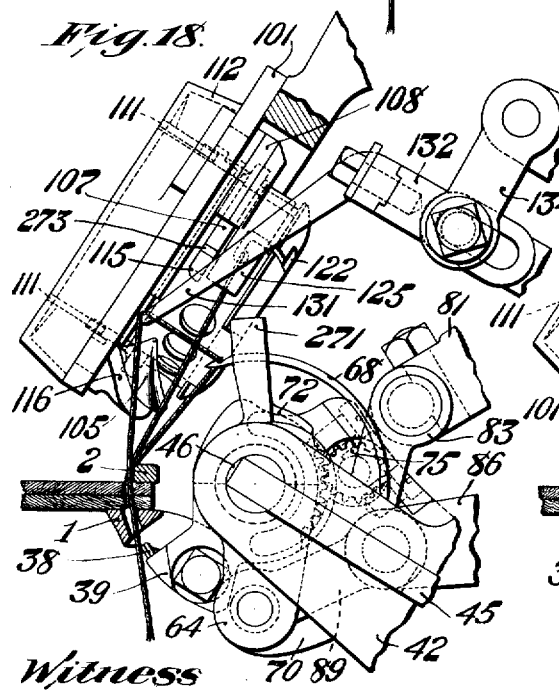
Figure 20:
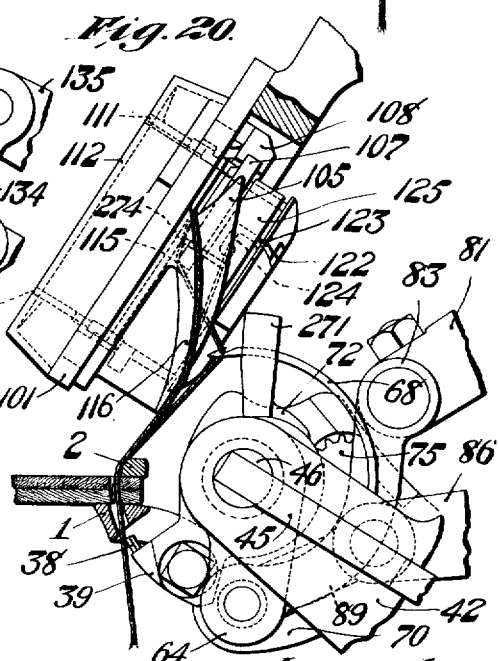

Figure 1 is a view in side elevation of a lock-stitch shoe sewing machine embodying the same in their preferred form. Fig. 2 is a view in side elevation of the machine looking in the opposite direction from Fig. 1. Fig. 3 is a view in front elevation of the machine. Fig. 4 is a view in sectional elevation of the machine taken on the line 4—4, of Fig. 3. Fig. 5 is a view in sectional elevation of the machine taken on the line 5—5, of Fig. 3. Fig. 6 is a central sectional view of the machine. Fig. 7 is a sectional plan view taken on the line 7—7, of Fig. 1. Fig. 8 is a detail sectional view illustrating particularly the feeding mechanism. Fig. 9 is a detail vertical sectional view illustrating particularly the manner in which the bobbin case is supported and the mechanism for actuating the rotary loop-taking hook. Fig. 10 is a detail sectional plan view illustrating the thread tension devices and a portion of the pull-off, take-up and thread-measuring devices. Fig. 11 is a detail view in side elevation of the presser foot mechanism. Fig. 12 is a sectional plan view of the tension devices and one of the thread locks. Fig. 13 is a detail view partly in section of a portion of the presser foot mechanism. Fig. 14 is a detail sectional view taken on the line 14—14, of Fig. 13. Fig. 15 is a detail view in side elevation of a portion of the edge gage mechanism and the welt channeling or fudge stitch device. Fig. 16 is a detail vertical sectional view of a portion of the feed mechanism. Fig. 17 is a view partly in section of the thread hook and bobbin case on a plane at right angles to the axis of the hook. This figure also illustrates the manner in which the bobbin thread leads to the work and the manner in which the needle thread is taken from the needle by the hook. Fig. 18 is a view in side elevation of the parts illustrated in Fig. 17. Figs. 19 and 20 are views similar to Figs. 17 and 18 but showing the parts in a different position. Figs. 21 and 22 are views similar to Figs. 17 and 18, showing the parts in still another position, certain parts which appear in Fig. 18 being omitted in Fig. 22. Fig. 23 illustrates the bobbin case detached from the machine. Fig. 24 is a central sectional view of the bobbin case. Fig. 25 is a central sectional view of the bobbin case taken on a plane at right angles to the plane of Fig. 24. Fig. 26 is a detail view of a portion of the cam track which is carried on the rotary hook and which operates the pins for holding the bobbin case against rotation. Fig. 27 is a detail view partly in section of the needle and awl carriers and their associated parts as viewed from beneath the awl carrier being at the limit of its movement to the left. Fig. 28 is a view similar to Fig. 27 but showing the awl carrier at the limit of its movement to the right. Fig. 29 is a detail sectional view illustrating particularly the awl carrier and its driver. Fig. 30 is a view similar to Fig. 29 but showing the awl in retracted position. Fig. 31 is a detail perspective view of the awl carrier. Figs. 32 and 33 are detail perspective views of the two parts of the awl driver. Fig. 34 is a detail plan view of a portion of the mechanism for releasing the tension on the thread and raising the presser foot when the direction of rotation of the driving shafts is reversed. Fig. 35 is a view in side elevation of the mechanism illustrated in Fig. 34 and also of the thread tension, tension lock and pull-off. Fig. 36 is a detail view in side elevation partly in section, of the tension lock and its actuating mechanism and Fig. 37 is a detail view, partly in section, of the needle segment and the needle oiling device.

The work is supported in the machine by means of a work support 1 and presser foot 2. The work support is of the usual construction, being secured to a stationary part of the machine frame and being shaped to enter the crease between the upper and the welt of a shoe so that the shoe, during the sewing operation is supported with the thread surface of the sole uppermost.

The work support is provided with the usual slot through which the needle and awl operate.

The presser foot is of the usual construction and is secured to the lower end of a presser foot lever 3. During the greater part of the cycle of operations of the machine, the presser foot is held firmly locked against the work so that the work is tightly clamped between the presser foot and work support. During the feeding of the work, however, the presser foot is raised from the work so as to offer no resistance to the feeding movement. At the end of the feeding movement the presser foot is released and is pressed yieldingly against the work so that it has an opportunity to accommodate itself to the thickness of the stock. After being pressed yieldingly against the work the presser foot is positively moved toward the work support a predetermined distance so as to firmly clamp the stock and is then locked in position. The presser foot remains locked until the beginning of the feeding movement when it is again lifted and the cycle of operations repeated. To enable the presser foot to be actuated as above described, the presser foot lever 3 is pivotally mounted on the frame of the machine and is provided with a downwardly extending arm 4 which is connected by means of a link 5 to a lever 6. The lever 6 is pivotally connected below the link 5 to the forward end of a link 7, and is pivotally connected above the link 5 to the forward end of a rod 8. The upper end of the lever 6 above the rod 8 is connected by means of a link 9, to the lower end of a lever 10 which is actuated by a suitably shaped cam on one of the driving shafts 11 of the machine. A spring 12 is connected at its forward end to the rear end of the link 7 and at its rear end to a pin projecting from a rod 13, the arrangement of the spring being such that it tends to pull the link 7 and lower end of the lever 6 rearwardly. The rod 13 is held in the frame of the machine by means of a split clamp 14 which allows for an angular adjustment of the rod to adjust the tension of the spring. The rod 8 is mounted to slide in a stationary block 15 secured to the frame of the machine and is locked against endwise movement and unlocked during each cycle of operations of the machine by mechanism hereinafter described. The unlocking of the rod 8 occurs at the end of the feeding movement while the presser foot 3 is in its raised position. When the rod 8 is unlocked the spring 12 acting through the link 7 pulls the lower end of the lever 6 to the rear thereby swinging the lever about its pivotal connection with the link 9. This movement of the lever 6 pulls the presser foot yieldingly down against the work and moves the rod 8 rearwardly through the block 15. After if necessary—the presser foot has been yieldingly forced into engagement with the work, the lever 10 is actuated to move the upper end of the lever 6 forwardly and during this movement the rod 8 is locked. During this forward movement of the upper end of the lever 6, after the rod 8 is locked, the lever swings about its pivotal connection with the forward end of the rod 8 and thus forces the presser foot positively an additional predetermined distance toward the work support to firmly and positively clamp the work. The presser foot is held locked in this position by the cam actuated lever 10 and by the locking device for the rod 8 until the beginning of the work feeding movement. At this time the lever 10 is actuated to move the upper end of the lever 6 to the rear thereby swinging the lever 6 about its pivotal connection with the rod 8 and positively raising the presser foot from the work. At the end of the feeding movement the rod 8 is unlocked and the presser foot is yieldingly pressed against the work by the action of the spring 12 as above described.

The locking device for the rod 8 comprises a nut 16 engaging a steep screw thread upon the rod 8 and a locking lever 17 arranged to lock the nut against rotation and to unlock the nut so as to permit it to rotate on the rod. The nut 16 is seated in a recess in the block 15, as best shown in Fig. 13, and is held against longitudinal movement with the rod 8. The lever 17 is provided with an aperture which surrounds the nut 16, as shown in Figs. 13 and 14, and the edges of this perforation are arranged to engage teeth upon the periphery of the nut so as to lock the nut against rotation. The lever 17 is pivoted upon studs 18 mounted in the block 15, the axis of which extends at right angles to, and passes through the axis of the rod 8 and nut 16. The construction and arrangement of the lever 17 are such that when the upper end of the lever is moved to the left, as viewed in Figs. 11 and 13, the nut 16 is unlocked and when the upper end of the lever is moved to the right, the nut is locked. When the nut 16 is unlocked it is free to rotate and permits a rearward movement of the rod 8 under the influence of the spring 12. When the nut is locked, however, it prevents any longitudinal movement of the rod 8 and thus permits the presser foot to be actuated by the cam actuated lever 10, as is hereinbefore described. To cause the nut 16 to be locked and unlocked at the proper times during the operation of the machine, the upper end of the lever 17 is connected by means of a link 19 to an arm 20 projecting from a sleeve 21 mounted upon a rod 22 at the rear of the machine. An arm 23 projects rearwardly from the sleeve 21 and is acted upon by a spring-pressed rod 24, the tendency of which is to raise the arm 23 and through the lever 20 and link 19 move the upper end of the lever 17 to the rear thereby locking the nut 16 against rotation. To move the upper end of the lever 17 in the opposite direction to unlock the nut 16, a cam actuated lever 25 is mounted upon the rod 22 and is provided with a projection 26 carrying a screw 27 arranged to engage the upper surface of the arm 23 and depress the arm against the action of the spring-pressed rod 24.

To enable the presser foot to be moved by the operator with the parts of the machine in any position which they assume during a cycle of operations, and particularly when the parts are in a position to permit the removal or insertion of work, a hand lever is provided and suitable connections whereby a movement of the lever will unlock and raise the presser foot. This lever is indicated at 28 and is pivotally mounted at 29 upon the presser foot lever 3. Below the pivotal connection 29, the lever 28 is provided with a projection 30 to which is pivotally secured the forward end of a link 31. The rear end of this link is provided with a slot through which passes the pin 32 forming the pivotal connection of the lever 17 with the link 19. The lever 28 is thus connected to the locking lever 17 through the link 31 so that a backward movement of the upper end of the lever 28 moves the lever 17 in a direction to unlock the nut 16. The lever 28 has a limited movement independent of the presser foot lever 3 sufficient to unlock the nut 16. To enable the lever 28 to raise the presser foot lever 3 during its continued movement, it is provided at its lower end with a contact screw 33 which engages the arm 4 of the presser foot lever and raises the presser foot. The lever 28 is returned to its original position with relation to the presser foot lever when released by the operator by a spring 34 interposed between the arm 4 and the lower end of the lever 28. The return movement of the lever 28 under the force of the spring 34 is limited by a contact screw 35, which engages the upper surface of the lever 3. The pivotal connection of the link 31 with the projection 30 of the lever 28 is so located that during the independent movement of the lever to unlock the nut 16 the pivotal connection is brought into a position concentric with the pivot of the presser foot lever so that the continued movement of the lever 28 in raising the presser foot does not produce any further movement of the locking lever 17. To regulate the movement of the link 31, an adjustable contact screw 36 is mounted in the rear end of the link 31. A contact screw 37 is also provided for the lower end of the lever 17 to limit its movement under the action of the hand operated lever 28 and to insure its movement into a position to unlock the nut 16. The slot in the rear end of the link 31 permits the lever 17 to be actuated automatically during the sewing operation to unlock the nut 16 without producing any movement of the hand operated lever 28.

The work is fed through the machine by means of a curved awl indicated at 38. This awl is secured to the awl carrier 39 by the usual clamp block 40 and is oscillated and moved laterally to feed the work. To provide a feeding mechanism which is light and durable so that the machine can be operated at a high rate of speed without producing stitches of varying lengths, the awl carrier 39 is rigidly secured to or formed integral with a pin or rod 41 which forms the pivot of the carrier. This rod 41 is mounted so as to be capable of oscillating and longitudinal movements in two stationary arms 42 and 43 projecting forwardly and upwardly from the machine frame. These arms are located as close to each other as is permitted by the desired length of bearing for the pin 41, by the desired length of feed movement and by the desired length of the bearing for the needle carrier hereinafter described which is journaled between the arms. The bearings for the rod 41 are necessarily located in close proximity and to the rear of the work support 1 and it is desirable that the space occupied by the arms 42 and 43 and the parts supported thereby be as narrow as possible in order to give room in which to manipulate the shoe being operated upon. Oscillating movements are imparted to the awl 38, awl carrier 39 and pin 41, by mechanism hereinafter described. The pin 41 is moved back and forth longitudinally to impart lateral feeding and return movements to the awl and awl carrier by means of two pivoted levers 44 and 45, the forward ends of which engage slots in bearing pins or buttons 46 provided with conical ends engaging conical recesses in the ends of the pin. The lever 44 is cam actuated as hereinafter described, and the two levers 44 and 45 are connected by a link 47, so that the levers are actuated in unison and the movements of the pin 41 in both directions are produced by the movements of the levers.

To take up any lost motion between the ends of the levers and the pins and to compensate for any wear, the pivotal connection of the link 47 with the lever 45 is in the form of an adjustable pin 48. The two levers 44 and 45 are arranged substantially parallel to each other and project forwardly through slots in the arms 42 and 43, which arrangement brings the levers into a comparatively narrow space and does not add appreciably to the width of the space occupied by the forward ends of the arms 42 and 43. The lever 44 is extended rearwardly beyond its pivot and is pivotally connected to one member of a toggle lever 49. The middle point of this toggle lever is connected by a link 50 to one arm of a bell crank lever 51, the other arm of which is provided with a roll 52 engaging a cam on the shaft 11, which through the connections above described imparts positive movements in both directions to the levers 44 and 45 and to the pin 41 of the awl carrier.

To enable the extent of the longitudinal movements of the pin 41 of the awl carrier to be varied as may be desired to produce the required length of stitch, one end of the toggle lever 49 is pivotally connected to a yoke 53 which is pivotally mounted in the machine frame above and below the toggle lever, as best shown in Fig. 16. By swinging this yoke about its pivot the position of the toggle lever 49 is changed so that when the toggle is actuated by the bell crank 51 more or less movement is imparted to the lever 44, and consequently to the pin 41 of the awl carrier. The pivot of the yoke 53 is arranged to be in line with the pivotal connections of the two members of the toggle lever 49 when said lever is in its extreme rearward position, which is the position of the lever after the awl has been moved to the left and is at the limit of its feeding movement. An adjustment of the yoke 53 about its pivot to vary the length of feed does not therefore vary the position of the awl at the end of its feeding movement so that with all lengths of feed the awl is always moved to the same point directly in line with the needle.

To enable the length of feed to be readily adjusted by the operator to give the desired number of stitches to the inch either on different shoes or on different parts of the same shoe, the yoke 53 is provided with an arm 54 connected by a link 55 to one arm of a bell crank lever 56, the other arm of which is connected by a link 57 to a hand operated lever 58, which is arranged in convenient position to be moved by the operator. The hand lever 58 extends over a perforated gage plate 59 on the frame of the machine in which pins 60 may be inserted on each side of the lever 58 to limit the movement of the lever in either direction.

To secure a finer adjustment of the feed than can be obtained by the use of the pins 60 alone, the lever 58 is provided with an adjustable cam disk 61 which can be turned into a position to engage a pin 60 on one side of the lever.

To steady the movement of the lever and hold it in adjusted position, a spring pressed plunger 62 is mounted on the lever and is provided with a V-shaped end arranged to engage a corresponding shaped guideway in the edge of the gage plate 59.

The mechanism for oscillating the awl carrier while permitting it to move laterally to feed the work comprises an awl driver mounted concentrically with the pin 41 of the awl carrier. This awl driver is made in two parts 63 and 64 for convenience of assembly, as illustrated in Figs. 32 and 33. Each of these parts is perforated to receive the pin 41 of the awl carrier and the part 63 is journaled on the pin while the part 64 is journaled on a boss projecting inwardly from the arm 42, as clearly shown in Figs. 27 and 28. The two parts, when assembled, are secured together by pins 65. The awl driver is held against lateral movement between the arms 42 and 43 and has a firm bearing on each side of the portion 39 of the awl carrier so that it can be operated smoothly and easily at a high rate of speed. To impart oscillating movements to the awl carrier and at the same time permit lateral movement of the awl carrier, a portion of the hub of the awl driver is cut away to form surfaces 66 and the hub of the portion 39 of the awl carrier is cut away to form similar surfaces 67 which are engaged by the surfaces 66. When the parts are assembled these surfaces are in a plane passing through the axis of the pin 41 of the awl carrier. The surfaces 66 are sufficient in extent to permit the necessary lateral movements of the awl carrier to produce any desired length of feed while the arrangement of the surfaces 66 and 67 is such that no twisting strain is brought upon the pin 41 of the awl carrier by either the oscillating or lateral movements of the carrier. The mechanism for oscillating the awl driver will be hereinafter described.

The needle 68 of the machine is a curved barb needle of the usual construction and is secured by a clamping block 69 to a needle carrier 70. This needle carrier is journaled upon a boss projecting from the arm 43 and upon a reduced portion of the part 63 of the awl driver, as is clearly shown in Fig. 27 and Fig. 28. The needle is supported by a needle guide 71 secured to a needle guide carrier 72 mounted upon the hub of the needle carrier 70, as illustrated in Figs. 27 and 28. The needle guide is actuated as is customary in lock stitch shoe sewing machines by means of a cam actuated bell crank 73, the forward projecting arm of which is provided with rack teeth engaging a pinion 74 which is connected to a pinion 75 which meshes with gear teeth 76 on the hub of the needle guide carrier.

In a lock-stitch wax thread sewing machine provided with a hooked needle and an awl, it is desirable that as the awl retracts the needle should follow the awl through the work as nearly as possible so as to insure the entrance of the needle into the hole made by the awl. It is also desirable that the movement of the awl should be so timed with relation to the other parts of the machine as to cause the awl to enter the work after the take-up has acted to pull the stitch into the work. The awl is thus out of the work while the stitch is being pulled in and the stock is not crowded over against the thread so as to partially close the last needle hole and prevent the thread from being drawn down properly into the work as would be the case if the awl were in the work during the operation of the take-up. It is also desirable, particularly in a machine provided with a curved needle and awl, that the advancing and retracting movements of both the needle and awl be made quickly and that the needle and awl remain in their retracted position for a comparatively long period during each cycle of operations of the machine in order to avoid interference with the other working parts of the machine and give as much time as possible for these parts to operate.

In machines as heretofore constructed it has been found necessary in order to produce these desired movements to drive the needle and awl by means of cams. In the machine illustrated in the drawings improved mechanism is provided for actuating the needle and awl, which imparts the desired movements to the needle and awl and which is easier and smoother in operation than the cam mechanism heretofore used and which is capable of being run at a higher rate of speed. This mechanism consists of continuously rotated cranks and connections between the cranks and needle and awl arranged to advance and retract the needle and awl during about a half revolution of the driving shaft, to hold them in retracted position during approximately one-half of a revolution of the driving shaft, and also operate them in timed relation to the other parts of the machine, cause the awl to enter the work after the take-up has pulled in the stitch, and cause the needle to follow the awl closely as the awl retracts through the work.

The crank from which the needle is actuated is indicated at 77 and is mounted upon a shaft 78 arranged parallel with the shaft 11 and driven therefrom by intermeshing gears 79 and 80 the proportion and arrangement of the gears being such that the two shafts 78 and 11 rotate at the same rate of speed but in opposite directions. The connections between the crank 77 and the needle carrier 70 consist of a bell crank 81, a link 82, connecting the crank to one arm of the bell crank, and a link 83 connecting the other arm of the bell crank to the needle segment. These connections, as will be apparent from an inspection of the drawings, are so arranged that a forward and backward movement is imparted to the needle while the crank 77 is traveling through approximately 180° and the needle is retained in its retracted position during the remaining 180° of revolution of the crank. This result is due mainly to the arrangement of the bell crank 81 with relation to the needle carrier 70, the arrangement being such that during the oscillating movement of the bell crank in each direction, the pivotal connection of the link 83 to the bell crank 81 crosses the line joining the pivot of the bell crank and the pivotal connection of the link 83 with the needle carrier. By reason of this arrangement an idle forward and backward movement is imparted to the needle while it is in its retracted position but this movement is not sufficient to bring the needle into engagement with the work or into a position where it will interfere with the operation of the other parts of the machine.

In a machine provided with a curved needle the distance through which the needle can be moved is limited and with a crank operated needle this idle forward and backward movement is necessary in order to properly time the needle with relation to the other parts of the machine. Also this idle forward and backward movement of the needle permits the needle to be substantially stationary when the loop is taken from the needle by the loop taker which passes the loop over the bobbin thread.

With the arrangement illustrated in the drawings the thread is taken from the needle by the loop taker just as the needle reaches the limit of its backward movement and before it makes its idle forward movement. By arranging the mechanism for actuating the needle so that the needle is substantially at rest while the loop is being taken, slight changes in the time of operations, due to wear or back lash in the actuating mechanism of the needle and loop taker, do not cause the loop taker either to miss the loop or strike the needle. The crank for actuating the awl is indicated at 84 and is mounted upon the driving shaft 11. The connections between the crank 84 and the awl driver 64 consist of a lever 85, a bell crank lever 86, a link 87 connecting the crank 84 with one arm of the lever 85, a link 88 connecting the other arm of the lever 85 with one arm of the bell crank 86 and a link 89 connecting the other arm of the bell crank 86 with the awl driver 64. These connections are arranged to impart an advancing and retracting movement to the awl during approximately 180° of the revolution of the crank 84 and to hold the awl in retracted position during the remaining 180° of revolution, an idle forward and backward movement, however, being imparted to the awl when in retracted position by reason of the fact that during each oscillation of the lever 85, the pivotal connection of the link 88 with the lever crosses a line joining the pivot of the lever with the pivotal connection of the link 88 with the bell crank 86. With a crank operated curved awl, the movement of which is necessarily limited, this idle forward and backward movement of the awl permits the awl to be properly timed with relation to the other parts of the machine.

With the construction illustrated in the drawings the awl, while in engagement with the work and during its feeding movement, remains substantially stationary, having but a slight forward and backward movement so that the awl tends to raise the work from the work support and facilitate the feeding of the work.

The needle is provided on its outer side with a thread receiving barb or hook. After the needle passes down through the work the thread is laid in the barb of the needle by means of a thread finger 90 and a looper 91. These parts have substantially the same motions and mode of operation as the thread arm and looper ordinarily used in curved hook needle lock stitch machines. These parts are, however, mounted in the machine in a somewhat different manner and are actuated by a novel mechanism.

The thread arm 90 is carried upon the upper end of an arm which is pivoted at its lower end to the frame of the machine. This arm is pivotally connected to the forward end of an inclined slide 92 mounted in the frame of the machine and pivotally connected at its rear end to a cam actuated lever 93 by means of a link 94, the cam actuating the lever 93 being mounted upon the driving shaft 11.

The looper 91 is provided with a shank which is clamped in a socket formed in the forward end of a link 95, the construction being such as to permit the longitudinal adjustment of the looper shank in the socket. The forward end of the link 95 is connected by means of a link 96 to the forward end of a lever 97, the rear end of which is engaged by a cam on the driving shaft 11 while the rear end of the link 95 is pivotally connected to one arm of the bell crank 98, the other arm of which is engaged by a cam also mounted upon the driving shaft 11. The link 95 carrying the looper is thus supported so that it can be moved longitudinally and laterally, the longitudinal movements being produced by the bell crank 98 and the lateral movements being produced by the lever 97. The cams which actuate the bell crank 98 and the lever 97 are so shaped that the looper is given the usual movements in this class of machines to present the thread to the thread arm and then to lay the thread in the barb of the needle.

The loop taker of the machine by which the loop of thread drawn through the work by the needle is passed over the locking or bobbin thread is of novel construction and is arranged and operated in an improved manner. This loop taker is in the form of a continuously rotating hook and is arranged to pass the loop of needle thread around a stationary bobbin case without itself passing through the loop. This hook is rotated continuously at a uniform rate of speed by a simple and compact mechanism and is so constructed and arranged as to permit the use of simple and efficient means for supporting the bobbin case and permitting the loop of needle thread to be passed around the case. The hook can be operated at a high rate of speed without liability of injury to its actuating mechanism and without setting up objectionable vibrations in the machine frame and the parts supported thereby. Furthermore, the hook is placed in the machine in such a position with relation to the other operating parts and particularly the needle and work support, that the hook and its actuating mechanism does not interfere with the manipulation of the work by the operator or its ready inspection at all times, that the hook draws out as short a loop as possible in passing the loop of needle thread over the bobbin case, that comparatively simple mechanism is required to present the needle loop in position to be taken by the hook and that the needle loop can be readily cast from the hook after the loop has been passed around the bobbin case.

As illustrated in the drawings, the rotary hook, indicated as a whole by the reference character 99, has the general form of a cylinder which is rotatably supported on the frame of the machine by means of two plates 100 and 101 each of which is provided with a semi-circular edge extending half way around the hook and engaging a guiding groove or raceway formed in the exterior surface of the hook, as is clearly shown in Figs. 9 and 17. The hook is rotated continuously from the shaft 78 of the machine by means of a bevel gear 102 meshing with bevel gear teeth cut upon the exterior surface of the hook, a shaft 103 to the forward end of which the gear 102 is secured and a bevel gear 104 secured to the rear end of the shaft 103 and meshing with a similar gear on the shaft 78. The shaft 103 is mounted in a portion of the machine frame which overhangs the needle and the plates 100 and 101, which support the rotary hook 99, project downwardly and forwardly from this overhanging portion of the machine frame so that the hook is supported above the work support and above and in front of the needle in a plane which is parallel to the axis of the needle movement and which extends obliquely backwardly from the work support over the needle. The rotary hook is thus supported in such position that it does not interfere with the inspection of the work by the operator at all times and does not prevent the operator from manipulating the shoe in the required manner during the sewing operation. The portion of the plate 101 which surrounds the rotary hook is only of the required width to properly support the hooks, as will be apparent from an inspection of Figs. 9 and 17, so that this plate does not take up an objectionable amount of room so as to interfere with the proper manipulation of the shoe. To enable the hook to engage the loop of needle thread and pass the thread about the bobbin case, it is provided with a beak or nose 105 formed on that portion of the hook which projects below the plates 100 and 101. In front of the beak 105, the wall of the hook is cut away or omitted to form an opening to receive that portion of the needle loop which is passed behind the bobbin case.

It will be noted that the portion of the hook 99 which carries the loop taking beak or nose 105, is directed toward the needle and is unobstructed so that the needle loop can readily be cast from the hook. For convenience this portion of the hook may be termed its inner or free end. This portion of the hook 99 supports the stationary bobbin case 106, illustrated separately in Figs. 23, 24 and 25. The bobbin case has the general form of a cylinder with one end closed and is provided with a peripheral flange 107 which is received in a supporting groove cut in the inner surface of the rotary hook. This flange 107 does not extend completely around the bobbin case but is omitted for about 90° of the circumference, as best shown in Fig. 23, to form an opening to permit the passage of the needle loop.

To enable the bobbin case to be placed in position in the rotary hook, a portion of the groove which receives the flange 107 is formed in a block 108 detachably secured to the hook. The inner end of the bobbin case, or the end which is directed toward the needle is closed while the outer end of the case is open to receive the bobbin 109. The outer end of the bobbin case is concentric with the rotary hook 99 so that the bobbin can be readily inserted and removed through the outer portion of the rotary hook.

To support the bobbin and hold it in position, a stud 110 projects centrally from the closed end of the bobbin case and is provided at its outer end with a split sleeve portion to form a central bearing and retaining device for the bobbin. The bobbin case is held stationary by means of two pins 111, arranged to engage the outer end of the bobbin case at substantially diametric points and mounted to slide in a stationary casing 112 secured to the plate 101 and shaped to extend inside of the outer portion of the rotary hook and also over the geared portion of the hook. Each of these pins near its lower end and on its outer side is provided with a slot which is engaged by a cam rib 113, projecting from the inner surface of the rotary hook 99, as best shown in Fig. 9. This cam rib is so shaped that during the revolution of the hook 99, the pins are raised at the proper times to permit the passage of the needle loop over the bobbin case, one or the other of these pins, however, being always in engagement with the case so that while no obstruction is presented to the passage of the loop over the case, the case is always held firmly against rotation. As a matter of convenience, in forming the cam rib 113, a portion of the rib is cut on a separate block 114, which is detachably secured in a suitably shaped recess in the hook.

The manner in which the loop of needle thread is passed around the bobbin case will be clearly understood from an inspection of Figs. 17 to 22, inclusive. After the loop of needle thread has been drawn through the work it is engaged by a loop spreader hereinafter described and moved into the position indicated in Fig. 18. As the rotary hook moves from the position indicated in Figs. 17 and 18, to that indicated in Figs. 19 and 20, the beak 105 of the hook enters the loop and lifts it from the loop spreader and needle. The portion of the loop leading to the preceding stitches, which portion may be termed the work side of the loop, passes inside of the hook beneath the beak 105 while the portion of the loop leading through the work to the supply, which portion may be termed the supply side of the loop, passes on the outside of the hook and rests on the outer surface of the beak. During the continued rotation of the hook, the work side of the loop which lies inside of the hook is engaged by the notch 115 at one end of the flange 107 of the bobbin case and is thereby prevented from being caught between the flange 107 and its supporting groove in the rotary hook. The continued rotation of the hook elongates the loop of thread by pulling thread through the work from the supply, which thread reaves over the beak 105, and carries the work side of the loop, or that side which is within the hook, over the bobbin case, the pins 111 being raised by the action of the cam rib 113 to allow the loop to pass successively beneath the pins. After the hook has carried the loop past the center of the bobbin case, the supply side of the loop, or that portion which lies on the outside of the beak 105, slips from the hook and the loop is drawn down into the work by the take-up hereinafter described. The rotary hook in passing the loop of needle thread about the bobbin case turns the loop half way around or puts a half twist in the loop, its action in effect being to cast the needle loop in the form of a half hitch around the bobbin case. The loop is readily cast from the rotary hook by reason of the oblique arrangement of the hook with relation to the surface of the work support. To facilitate the casting off of the loop and to guard against the winding of the thread around the hook, the hook is provided back of the beak 105 with a shoulder or rib 116, which extends obliquely inward from the throat at the base of the beak 105 to the inner end of the hook.

To facilitate the removal of the bobbin from the bobbin case, the closed end of the case is provided with an opening 117 through which an ejecting arm 118 may be moved whenever it is desired to remove the bobbin. The arm 118 is mounted upon a rock shaft 119 journaled in the frame of the machine and provided with a handle 120 which projects upwardly into a convenient position to be grasped by the operator. The arm 118 is normally held in retracted position by a spring 121 coiled around the shaft 119 and having one end secured to the frame of the machine and the other end in engagement with the handle 120. The closed end of the bobbin case is also provided with an opening 122 which connects, by means of a slot 123, with an opening 124 in the side of the case. This arrangement enables the bobbin case to be conveniently threaded before the bobbin is inserted in the case, the thread being passed rearwardly through the opening 122 and then being pulled forwardly through a slot 123 into the recess 124 and underneath the tension spring 125. The tension spring 125 is a leaf spring, the free end of which presses the bobbin thread against the outer surface of the bobbin case and the other end of which is secured to the bobbin case by a screw 126.

To enable the tension on the bobbin thread to be adjusted, the spring 125 is provided with a slot to receive the screw 126 so that the spring can be adjusted longitudinally and is provided between its ends with a bent portion 127 which passes beneath an abutment pin 128.

To enable the bobbin case to be readily cleared of the wax which may accumulate therein, and also to lighten the case, a series of holes 129 are formed in the wall of the case opposite to that portion which supports the tension spring 125. The closed end of the bobbin case fits snugly within the inner end of the rotary hook but a portion of its periphery is cut away, as indicated at 130, to form an opening corresponding to the opening in the flange 107 to permit the passage of the needle loop and bobbin thread. The inner end of the rotary hook 99 extends from the beak 105 substantially flush with the closed end of the bobbin case for a portion of its circumference, so as to prevent the supply side of the needle loop from catching on the bobbin case. For the rest of its circumference, however, the inner end of the rotary hook recedes from the closed end of the bobbin case, as best shown in Fig. 18, so as to facilitate the escape of the work side of the needle loop when the loop is pulled into the work.

While the needle loop is being passed around the bobbin case by the rotary hook there is a tendency for the loop to catch on the needle guide. To prevent this the needle guide of the machine is provided with a lateral extension 271. Also while the needle loop is being drawn into the work by the take-up, there is a tendency for the loop as it leaves the bobbin case to fall downwardly and backwardly so as to become entangled with the needle or needle guide. To prevent this a finger 272 is secured to the plate 101 and projects downwardly and forwardly at the right hand side of the rotary hook into proximity to the path of motion of the needle.

It sometimes happens that the loop of needle thread as it is taken by the rotary hook does not draw down into the throat of the hook and consequently is carried outside of the flange 107 of the bobbin case and becomes caught between the flange and its supporting groove in the rotary hook.

To prevent the hook and bobbin case from becoming wedged together by thread carried outside of the flange 107 the flange is provided with a second notch 273 beyond the notch 115 to receive this thread and the rotary hook is provided with a transverse slot 274 crossing the supporting groove back of the beak 105 which coöperates with the notch 273 to cut the thread and allow it to escape.

The loop-spreader which coöperates with the needle in presenting a loop of thread to the rotary hook, is indicated at 131 and consists of a bent arm secured to the forward end of a link 132 so as to be capable of an adjustment thereon toward and from the plane of the needle. The link 132 is pivotally connected at its rear end to the lower end of a lever 133, which is engaged by a cam on the shaft 78. About midway its length the link 132 is connected by means of a link 134 to one arm of a bell crank 135, the other arm of which is engaged by a cam on the shaft 78. The link 132 is thus supported so that it can be raised and lowered by the action of the bell crank 135 and can be moved longitudinally and oscillated by the lever 133 and link 134. The shape of the cams for actuating the levers 133 and 135, and the arrangement of the parts is such that at the proper times during the operation of the machine, the loop spreader 131 is moved from within the circle of the needle outwardly and upwardly so as to engage the supply side of the needle loop and lift the needle loop into the position indicated in Fig. 18. The side of the needle loop engaged by the loop spreader is that side which is on the opposite side of the needle from the rotary hook so that the thread which leads directly from the work to the needle is on the side of the needle toward the hook and the hook can readily take the loop from the needle. During its movement into the position indicated in Fig. 18, the end of the loop spreader moves into the path of the shoulder 116 on the rotary hook and the mechanism for actuating the loop spreader is so constructed and timed that the spreader is withdrawn from this position after the beak has entered the loop and before the shoulder has come in contact with the end of the spreader, the end of the spreader during this movement moving over the beak of the hook and in the space between the outer surface of the beak and the surface of the shoulder. To permit an adjustment of the movement of the loop spreader the link 134 is adjustably secured to the link 132 by means of a pin and slot.

The devices for controlling and handling the needle thread, in addition to those already described, comprise a tension, a pull-off, a main take-up, an auxiliary take-up, a thread measurer and two thread locks, one of which locks the thread between the pull-off and the work, and the other of which locks the thread between the pull-off and the supply. These parts are constructed and arranged to operate in an improved manner and are actuated by novel mechanism.

The tension device consists of two intermeshing gear wheels 136 and 137. These wheels are mounted on a bracket 138, forming a part of the machine frame, the gear 136 being journaled loosely on a supporting stud 139 and the gear 137 being rigidly secured to the short horizontal shaft 140. The thread leads upwardly from the wax-pot, hereinafter described, over the gear 137, then downwardly between the two gears, and then upwardly around the gear 136. To enable the gears to be adjusted for operation on different sizes of thread, the shaft 140 carrying the gear 137 is journaled in a block 141, which is mounted to slide toward and from the gear 136 in a horizontal slot in the bracket 138. The block is adjusted and locked in position by means of a nut 142 engaging a plate 143, secured to the bracket 138 and screw-threaded upon a rod 144 projecting from the block 141. A suitable friction device is provided for retarding the rotation of the gear 137 so that a strain exerted upon the thread on the work side of the tension device will rotate the gear 136 until the thread is securely clamped between the teeth of the gears 136 and 137. The thread is thus firmly held by the gears and can only be drawn from the supply by rotating the gears. The friction device for retarding the rotation of the gear 137 comprises a disk 145, secured to or integral with the shaft 140, an abutment 146 on the block 141 at one side of the disk 145 and a brake shoe or disk 147 at the other side of the disk. Suitable friction washers are interposed between the disk 145 and the abutment 146 on one side and the brake shoe 147 on the other side. The free end of a short lever 148 pivoted on the bracket 138 bears against the brake shoe 147 and this lever 148 is engaged by one arm of a bell crank lever 149 pivoted concentrically with the lever 148. The other arm of the bell crank 149 is acted upon by a coiled spring 150 interposed between the bracket 148 and the cap 151 at the inner end of an adjustable screw 152 seated in the arm of the bell crank, the tendency of the spring being to swing the bell crank in a direction to force the lever 148 against the brake shoe 147 and the brake shoe against the disk 145. By means of the adjustable screw 152 the pressure of the brake shoe 147 against the disk 145, and consequently the tension on the thread, can be varied as may be desired.

The pull-off by which, during each cycle of operations of the machine, enough thread is pulled from the supply for the formation of the succeeding stitch, is indicated at 153, and consists of a pin secured in the end of an arm projecting from a sleeve 154 journaled on a rock shaft 155. The sleeve 154 is rocked at the desired times during the operations of the machine, to cause the pull-off to pull-off the desired amount of thread by a longitudinally adjustable link 156 connecting an arm 157 projecting from the sleeve 154 with an arm 158 projecting from the sleeve which forms the hub of the lever 85 through which the curved awl is actuated as hereinbefore described. The throw of the pull-off 153 is constant and in order to cause it to pull off the required amount of thread, which varies with the thickness of the material being sewed, it is arranged to pass between two thread-guiding eyes 159 and 160, through which the thread passes on its way from the tension device to the work, and these eyes are connected to the presser foot mechanism hereinbefore described so that their position with relation to the pull-off is changed with any variation in the thickness of the work being operated upon.

As will be apparent from an inspection of Figs. 3 and 5, the thread passes from the tension device up through the eye 159, then in a substantially horizontal direction above the pull-off 153 and then upwardly through the eye 160. The pull-off engages the thread between the eyes during its upward stroke and it will be obvious that since the stroke of the pull-off is constant the amount of thread pulled from the supply by the pull-off will vary with the position of the eyes, and more especially with the position of the eye 160. During its upward movement the pull-off pulls thread from the supply through the eye 159 in the direction in which the thread leads through the eye, the lower surface of the eye 160 forming an abutment or thread guide past which the pull-off moves. The eye 160 therefore forms the essential part of the thread measuring device although the eye 159 performs an important and useful function in leading the thread to the eye 160 so that it will be properly engaged by the pull-off. To cause the position of the eyes 159 and 160 to be changed with relation to the pull-off when the thickness of the stock varies, the eyes are formed in an arm 161 projecting from a rock shaft 162, which is provided with an upwardly projecting arm 163 pivotally connected to the rear end of the link 7 of the presser foot mechanism hereinbefore described.

The main take-up is indicated at 164 and consists of an arm secured to a rock shaft 165 and provided at its free end with a take-up roll over which the needle thread passes. To secure ease, smoothness and certainty of operation when the machine is running at high speed, the rock shaft 165 carrying the take-up arm 164 is operated through suitable connections from a continuously rotating crank 166 on the driving shaft 11. These connections consist of a link 167 connecting the crank 166 to an arm 168 projecting from a rock sleeve 169, an arm 170 projecting from the sleeve 169, an arm 171 projecting from the shaft 165 and a link 172 connecting the arms 170 and 171. The take-up arm 164 swings through an arc of approximately 180° and the arrangement of the connections above described for actuating the rock shaft 165 is such that the take-up action of the take-up roll is comparatively slow at the beginning and end of the loop drawing stroke and is comparatively rapid in the middle of the stroke. This movement of the take-up is desirable in order that the thread pulling movement may be comparatively slow while the loop of needle thread is being pulled from the upper portion of the bobbin case and may also be slow at the time the thread is being pulled into its final position in the work. An oscillating take-up arm, when operated at high speed, is liable to overthrow.

To prevent any overthrow of the arm 164 varying the amount of thread in the loop pulled out by the arm during its take-up stroke, the arm is arranged to pass beyond its central position with relation to the loop which it draws out, this central position being the position of greatest loop extension. The greatest amount of thread which the take-up can act upon is thus drawn out before the take-up completes its backward stroke so that any overthrow of the take-up does not vary the amount of thread in the loop drawn out by the take-up and the take-up is absolutely certain and uniform in its action regardless of the speed at which the machine is operated.

The take-up has a definite timed relation to the movement of the rotary hook which carries the loop of thread over the bobbin case, and the needle and awl have a definite timed relation to the movements of the take-up and rotary hook as hereinbefore described.

In order to permit the take-up, needle and awl to be operated by continuously rotating cranks in the desired timed relation to each other and to the rotary hook, the rotary hook hereinbefore described is rotated at a speed which causes it to make three complete revolutions during each cycle of operations of the machine.

The auxiliary take-up of the machine illustrated in the drawings is indicated at 173 and consists of a thread truck mounted upon the outer end of the arm 174. This arm is pivotally mounted and is acted upon by a coiled spring 175, the free end of which projects beneath the stud on which the roll is mounted and tends to raise the roll. The rear portion of the auxiliary take-up arm 174 is provided with shoulders which limit the movement of the arm in each direction as is common in auxiliary take-up constructions heretofore used. The needle thread leads over the auxiliary take-up 173, then under the roll of the main take-up and then upwardly through the looper to the work. The auxiliary take-up coöperates with the main take-up in keeping taut the thread leading over the two take-ups to the work. In a machine provided with a cam actuated take-up, the take-up during its forward or thread-delivering stroke can be moved in such a manner that it will give up the required amount of thread to the thread finger, looper, needle, loop-spreader, and loop taker and any slackness in the thread can be taken care of by an ordinary yieldingly mounted auxiliary take-up. With a crank-operated take-up, however, the movements of the take-up cannot be so timed as to permit the use of an ordinary spring-pressed auxiliary take-up to control slackness in the thread, at least without objectionable complication of the mechanism for actuating the take-up.

To permit the use of a simple crank-actuated mechanism for operating the take-up and at the same time enable the thread between the supply and the work to be properly controlled at all times, the machine illustrated in the drawings is provided with mechanism for moving the auxiliary take-up so that it coöperates with the main take-up in controlling the thread and prevents the formation of any slack. The mechanism for actuating the auxiliary take-up comprises an arm 176 on the forward end of which the auxiliary take-up arm 174 is pivoted. The arm 176 is fast on a rock shaft 177 to which is also secured a downwardly projecting arm 178. The arm 178 is pivotally connected to one link of a toggle 179, the center joint of which is connected by means of a link 180 to a bent lever 181. The lever 181 is provided with a roll engaging a cam on the driving shaft 11, which is shaped so as to oscillate the lever at the desired times during the operation of the machine and through the connections above described, impart the desired movements to the arm 176 and the auxiliary take-up mounted thereon. When the main take-up is in its highest position the auxiliary take-up is also in its highest position and at this time the loop of needle thread is being passed over the bobbin case by the rotary hook. At this time the thread is held locked by the locking device hereinafter described between the pull-off and the auxiliary take-up, and there is just sufficient thread between the thread lock and the preceding stitch to cause the thread to be pulled taut just as the needle loop passes over the top of the bobbin case. This pull on the thread pulls the needle thread leading from the preceding stitch tightly against the welt of the shoe. As the loop of needle thread passes over the top of the bobbin case the arm 176 is lowered slightly to move the auxiliary take-up downwardly and relieve, to some extent, the tension on the thread so that it can slip readily over the bobbin case. The main take-up now begins to descend and pulls the thread off of the hook and down into the work, the auxiliary take-up being positively raised to its original position while the loop drawing movement of the main take-up is taking place. The stitch is completely set when the main take-up arm 164 is in its central position with relation to the loop of thread which it is acting on and at this time the eye of the looper is directly in line with the last needle hole. As the main take-up arm 164 continues its swinging movement it gives up a slight amount of thread and at this time the looper moves rearwardly and to the left to bring the thread back of the thread arm. The thread arm now moves backwardly to draw out a loop of thread and while this movement of the thread arm is taking place the auxiliary take-up is positively lowered to supply the thread necessary for the formation of the thread arm loop. The positive downward movement of the auxiliary take-up is continued while the looper moves forwardly and across the needle to lay the thread in the barb of the needle and at the same time the main take-up arm begins its return movement. As the main take-up arm swings back to its original position it gives up thread to the needle, loop spreader, and rotary hook and during a portion of this movement the auxiliary take-up is positively raised to its original position so as to properly control the thread and prevent the formation of any objectionable slackness.

The thread lock, for locking the thread between the pull-off and the work so as to enable the pull-off to draw thread from the supply, consists of an arm 182 secured to the rock shaft 155 and provided at its free end with a brake shoe arranged to clamp the thread on the surface of a thread truck 183 around which the thread passes on its way from the eye 160 to the auxiliary take-up. The rock shaft 155 is actuated so as to cause the arm 182 to clamp and release the thread at the desired times during the operation of the machine by means of a lever 184 actuated from a cam on the shaft 11, an arm 185 projecting upwardly from the shaft 155 and a longitudinally adjustable link 186 connecting the arm and lever.

The thread lock for locking the thread between the pull-off and the supply, comprises a band brake 187 surrounding the periphery of the disk 145, which is secured to the shaft carrying the tension gear 137. This band brake is actuated at the desired times during the operation of the machine to clamp and release the disk. When the disk is clamped the gear 137 of the thread tension device is locked against rotation so that no thread can be pulled from the supply through the tension device. One end of the band brake 187 is pivoted upon the block 141 in which the shaft of the gear 137 is journaled, and the other end of the band brake is pivotally connected to a short link 188. A hollow rod 189 passes through the upper end of the link 188 and has a sliding connection therewith, the upward movement of the rod with relation to the link being limited by a shoulder 190 at the lower end of the rod. A coiled spring 191 surrounds the rod and presses at its lower end against the upper end of the link 188 and at its upper end against an adjustable nut 192 mounted on a screw-thread cut on the outer surface of the rod. The rod is thus yieldingly supported on the link and compresses the spring when it is forced downwardly through the link. At its upper end the rod 189 is provided with an adjustable cap 193 engaging the screw-thread on the external surface of the rod. This cap provides means by which the effective length of the rod 189 can be adjusted. A rod 194 passes downwardly through the hollow rod 189 and is provided at its upper end with a shoulder 195 adapted to engage the upper end of the cap 193. This rod 194 is pivotally connected at its upper end to an arm 196 projecting from the rock sleeve 154, which forms a portion of the mechanism for actuating the pull-off hereinbefore described. It will be obvious that a movement of the rock sleeve 154 in one direction will depress the rod 194 until the shoulder 195 contacts with the cap 193 and that thereafter the hollow rod 189 will be depressed and through the spring 191 and link 188 operate the band brake 187 to clamp the disk 145 while a movement of the rock sleeve 154 in the opposite direction will raise the rod 194 and allow the band brake to release the disk.

During the operation of the machine the two thread locks are so actuated that during the thread drawing movement of the pull-off the thread is locked between the pull-off and the work and is unlocked between the pull-off and the supply, while during the thread pulling stroke of the take-up the thread is locked between the pull-off and the supply and is unlocked between the pull-off and the work. During the action of the pull-off the thread is firmly gripped between the arm 182 and the thread truck 183, and during the action of the take-up the thread is firmly grasped between the teeth of the tension wheels 136 and 137. Any slipping of the thread is thus absolutely prevented and the pull-off is caused to pull from the supply the precise amount of thread required for the stitch and all of this thread is pulled taut by the take-up in setting the stitch. The thread for each stitch is thus measured accurately and is handled in a certain and reliable manner so that a uniform tight seam is produced, the stitches of which are all pulled into the work a uniform distance.

To guide the work through the machine and enable the line of stitching to be located at the desired distance from the edge of the sole at different portions of the shoe, the machine illustrated in the drawings is provided with an edge gage and improved mechanism for moving the edge gage to vary the distance of the seam from the edge of the sole. The edge gage is indicated at 197 and is located above and at the rear of the work-support 1 in position to engage the edge of the shoe sole. The downwardly extending shank of the edge gage is secured to an arm 198 so as to be capable of vertical adjustment thereon. The arm 198 is pivoted at 199 on the frame of the machine below the work support so as to be capable of a swinging movement to move the edge gage 197 over the upper surface of the work support toward and from the awl and needle.

To enable the arm 198 to be conveniently moved by the operator a block 200 is rigidly secured to the lower end of the arm back of its pivot and is provided with a curved groove 201 which is engaged by a roll at the upper end of an arm 202. This arm is secured to a rock shaft 203 from which a handle 204 projects forwardly into convenient position to be manipulated by the operator.

To enable the extent of the movements imparted to the edge gage to be adjusted, the block 200 is adjustably connected to the arm 198 this connection consisting of a pivot pin 205 connecting the block and the arm, and a screw-threaded rod 206 pivotally connected to an ear projecting upwardly from the block 200 and having a screw-threaded engagement with an adjusting nut 207 seated in a slot in the arm. A rotation of the nut 207 tips the block 200 about its pivotal connection 205 and thereby changes the position of the groove 201 with relation to the shaft 203 of the arm 202, so that when the arm is moved a greater or less movement is imparted to the arm 198 carrying the edge gage.

The machine illustrated in the drawings is also provided with a channeling or grooving knife to channel or groove the surface of the welt to receive the stitches of the seam and with improved means for supporting and actuating the knife. This knife is formed upon the upper end of a rod 208 secured so as to be capable of vertical longitudinal adjustment in a carrier block 209. The upper end of the rod 208 projects through the slot in the work support 1 at one side of the awl, the knife at the upper end of the rod projecting above the surface of the work support a sufficient distance to form a groove or channel of the desired depth. By adjusting the rod vertically in the block 209, the depth of cut may be regulated as desired. In the construction illustrated in the drawings the knife is arranged to move back and forth in the line of feed with the awl so that the knife makes its cutting stroke during the return lateral movement of the awl while the work is stationary and firmly clamped between the presser foot and work support. To cause the knife to move with the awl the block 209 is mounted upon an arm 210 secured to a rock shaft 211 extending at right angles to the direction of feed. To the inner end of the shaft 211 an upwardly projecting arm 212 is secured and this arm is pivotally connected to one end of a curved bar 213, the other end of which is connected to the link 47 of the feed mechanism hereinbefore described. The arm 210 is thus oscillated by the feed mechanism and the welt grooving or channeling knife is caused to move back and forth in the line of feed with the feeding awl. It is customary in outsole shoe sewing machines to cut a channel or groove in the welt at the forepart of the shoe only and to sew the seam nearer to the edge of the sole on the forepart than on the shank. In the machine illustrated in the drawings these results are secured by retracting the edge gage when the shank portion of the shoe is reached in the sewing operation and simultaneously depressing the grooving or channeling knife below the surface of the work support. To enable the knife to be depressed simultaneously with the rearward movement of the edge guide, the block 209 is mounted to slide in the arm 210 and is connected to the arm 198 carrying the edge gage by means of a bell crank lever 214, which is pivotally mounted on the arm 210 and provided in each end with a slot, one of which is connected by a pin 215 projecting from the arm 198 and the other of which is engaged by a pin 216 projecting from the block 209. By means of this connection between the arm 198 and the block 209 the grooving or channeling knife is projected above the surface of the work support when the edge gage is moved forward in operating on the forepart of the shoe and is retracted below the surface of the work support when the edge gage is moved to the rear in operating on the shank.

The thread supply of the machine illustrated in the drawings consists of a ball or cop 217 which rests in a box or cagelike holder 218. This holder is located at one side of the head of the machine beneath a table 219, the thread leading from the cop upwardly through the center of that portion of the table which forms a cover for the holder and then along the upper surface of the table and downwardly into the wax pot hereinafter described. The thread holder is pivotally connected to the table at 220 so that it can be swung out from beneath the table for the insertion of a ball or cop and is locked in position beneath the table by means of a latch 221 pivoted to the edge of the table and arranged to engage an arm 222 projecting from the holder on the opposite side from the pivot 220.

The wax pot of the machine is indicated at 223. This pot is supported substantially in the center of the machine beneath the table 219 by means of a supporting rod 224 to which the pot is clamped by a split clamp on the upper rear portion of the pot by a clamping screw 225. The wax in the pot is heated by a U-shaped steam pipe 226 extending down into the wax in the pot and secured to the bracket 227 forming a part of the machine frame. This bracket also supports a stripper 228 through which the thread passes on its way from the pot to the thread handling devices of the machine. The cover of the pot is formed by flanges projecting downwardly from the table 219. The side flanges 229 are vertical, and are substantially in line with the side walls of the pot, while the front flanges 230 are inclined rearwardly from the front wall of the pot. Directly above the pot and within the flanges 229 and 230 the table 219 is provided with an opening to form a flue for the passage of the heat from the wax pot up into the head of the machine. To permit ready access to the wax pot and to the parts of the machine located immediately above and below the table 219, the table is formed in two parts, the line of division being substantially in the center of the machine. The two halves of the table are pivotally supported at the back of the machine at 231 and 232 respectively, so that they can be swung away from each other in a horizontal plane. When brought together, as indicated in Fig. 7, they are held in position by means of a suitable latch 233. It has heretofore been proposed to provide a curved hook needle sewing machine with a device for applying oil to the needle so as to prevent the needle from sticking in the needle guide or in the work. The machine illustrated in the drawings is provided with an improved needle oiling or lubricating device which is simple in construction, efficient in operation and which is not liable to injury during the operation of the machine. This device consists of an arm 234 pivotally mounted at 235 on the guide for the needle carrier and provided at its forward end with an opening to receive the mass of absorbent material 236. The rear end of the arm 234 is connected by a coiled spring 237, the tendency of which is to move the arm 234 so as to bring the mass of absorbent material 236 into contact with the needle. The mass of absorbent material forms an oiling pad to which oil is supplied by means of a tube 238 leading from an oil cup 239 to a position directly over the forward end of the arm 234.

To prevent the needle carrier during its forward movement from coming in contact with the forward end of the arm 234, the arm is so shaped and arranged that a portion of the arm substantially midway of its length extends into the path of movement of the needle carrier. The arm is thus engaged by the needle carrier during its forward movement and the forward end of the arm and the oiling pad are raised out of the path of movement of the needle carrier. At the completion of the sewing operation when the work is to be removed from the machine, it is necessary to raise the presser foot from the work and it is also desirable to release the tension on the thread so that thread may be drawn from the supply when the work is pulled out of the machine. The machine illustrated in the drawings is provided with simple and efficient means by which both of these operations may be performed by a reversal of the driving shafts of the machine after the machine has been stopped. These means comprise a swinging arm 240 pivotally mounted at its rear end upon the upper end of the bell crank lever 241 and provided at its forward end with two curved surfaces 242 and 243 located at different distances from the pivot of the arm and arranged to bear against a sleeve 244 on the driving shaft 11. Between the surfaces 242 and 243 is a projection 245, which upon a reversal in the direction of rotation of the shaft 11, is arranged to be engaged by a notch 246 in the sleeve 244. A reversal in the direction of rotation of the driving shaft 11 swings the arm 240 on its pivot and a continued rotation of a shaft moves the arm 240 longitudinally and swings the bell crank lever 241. A spring 247 connected to the arm 241 and bearing upon a pin 248 projecting from the arm 240 tends to hold the arm in its raised position. To the horizontal arm of the bell crank 241 is pivotally connected the upper end of a cord 249, which cord passes through a flexible sleeve 250 secured at its opposite ends to the frame of the machine. At its lower end the cord 249 is connected to the bell crank 149 of the thread tension mechanism so that as the bell crank 241 is moved when the direction of rotation of the shaft 11 is reversed, the cord 249 is pulled upon to move the bell crank 149 against the tension of the spring 150 and releases the friction which retards the rotation of the tension gear 137.

To cause the presser foot to be raised simultaneously with the release of the tension on the thread, the pivot pin 251, which connects the bell crank 241 with the arm 240, is arranged to engage a set screw mounted in an arm 252 projecting upwardly from a rock shaft 253. This rock shaft is provided with another upwardly projecting arm 254 which is connected by means of a link 255 to the presser foot lifting lever 28. A backward movement of the arm 240 produced by a reversal in the direction of rotation of the shaft 11, therefore, rocks the shaft 253 and raises the presser foot simultaneously with the release of the thread tension.

The means for heating the machine comprise two steam pipes 256 and 257 extending backwardly in a horizontal plane from the upper ends of the U-shaped pipe 226 which extends down into the wax in the wax pot. From the pipe 256 a pipe 258 extends upwardly and communicates with a steam passage 259 extending through the base of the machine at the rear of the tension mechanism. This steam passage 259 communicates with a steam chest 260 located in the central lower portion of the machine head by means of a pipe 261. A pipe 262 leads from the steam chest 260 to a pipe 263 which extends upwardly through the head of the machine and communicates with a steam passage 264. This passage is connected by means of a pipe 265 to a heating chamber 266 formed in that portion of the machine frame which supports the rotary hook driving mechanism. This chamber communicates with the source of steam supply by means of a pipe 267. The steam chest 260 is provided at one end with a vertical plate 268 which forms one side of a chamber within which the take-up operates. The other side and front wall of this chamber is formed by a flanged plate 269, pivotally mounted at 270 upon the table 219 so that it can be swung outwardly to permit access to the parts which it incloses.

The invention having been thus described, what is claimed is:—

1. A sewing machine, having, in combination, stitch forming devices including a curved hook needle, a curved awl, an awl carrier, a pivot pin for the awl carrier rigid therewith, means for moving the pin longitudinally in opposite directions, an awl driver held from longitudinal movement with the pin and having a bearing concentric with the pin on each side of the awl carrier, mechanism for oscillating the awl driver, and coöperating means on the awl driver and awl carrier for imparting the oscillating movements of the driver to the carrier while permitting the carrier to move longitudinally with the pin.

2. A sewing machine, having, in combination, stitch forming devices including a curved hook needle, a curved awl, an awl carrier, a pivot pin for the awl carrier rigid therewith, means for moving the pin longitudinally in opposite directions, an awl driver mounted concentric with the pin, and mechanism for oscillating the awl driver, the hubs of the awl driver and awl carrier being provided with coöperating surfaces to cause the carrier to be oscillated by the driver while permitting the carrier to move longitudinally with the pin independently of the driver.

3. A sewing machine, having, in combination, stitch forming devices including a curved hook needle, a curved awl, an awl carrier, a pivot pin for the awl carrier rigid therewith, supporting brackets on each side of the awl carrier in which the pivot pin is journaled, an awl driver mounted concentric with the pivot pin and constructed to engage and oscillate the awl carrier while permitting it to move longitudinally with the pin independently of the driver, and means for oscillating the awl driver.

4. A sewing machine, having, in combination, stitch forming devices including a curved hook needle, a curved awl, an awl carrier, a pivot pin for the awl carrier rigid therewith, means for moving the pin longitudinally in opposite directions, supporting brackets on each side of the awl carrier in which the pin is journaled, an awl driver journaled on one of the brackets concentric with the pin and constructed to oscillate the awl driver while permitting it to move longitudinally with the pin independently of the driver, and means for oscillating the awl driver.

5. A sewing machine, having, in combination, stitch forming devices including a curved hook needle, a curved awl, an awl carrier, a pivot pin for the awl carrier rigid therewith, means for oscillating the awl carrier, pivotally mounted levers arranged with their ends in engagement with the opposite ends of the pin, and mechanism for actuating the levers to move the pin positively in opposite directions.

6. A sewing machine, having, in combination, stitch forming devices including a curved hook needle, a curved awl, an awl carrier, a pivot pin for the awl carrier rigid therewith, means for oscillating the awl carrier, a pivoted lever engaging one end of the pin to move the pin in one direction, a pivoted lever engaging the other end of the pin to move the pin in the opposite direction, and means for actuating the levers.

7. A sewing machine, having, in combination, stitch forming devices including a curved hook needle, a curved awl, an awl carrier, a pivot pin for the awl carrier rigid therewith, means for oscillating the awl carrier, pivotally mounted levers having their ends in engagement with opposite ends of the pins, a link connecting the levers, and a cam and intermediate connections to one of the levers for oscillating levers to move the pin longitudinally in opposite directions.

8. A sewing machine, having, in combination, stitch forming devices including a curved hook needle, a curved awl, an awl carrier, a pivot pin for the awl carrier rigid therewith, means for oscillating the awl carrier, supporting brackets on opposite sides of the awl carrier substantially parallel to the plane of movement of the needle, pivoted levers extending through the brackets and having their ends in engagement with opposite ends of the pin, and means for actuating the levers to move the pin longitudinally in opposite directions.

9. A sewing machine, having, in combination, stitch forming devices including a curved hook needle, a curved awl, an awl carrier, a pivot pin for the awl carrier rigid therewith, pivotally mounted levers having their ends extending over the opposite ends of the pin, bearing buttons interposed between the ends of the levers and the pin, and means for actuating the levers to move the pin longitudinally in opposite directions.

10. A sewing machine, having, in combination, stitch forming devices including a curved hook needle, a curved awl, an awl carrier, a pivot pin for the awl carrier rigid therewith, a supporting bracket at each side of the awl carrier, an awl driver mounted concentric with the pin between said brackets constructed to oscillate the awl carrier while permitting it to move longitudinally with the pin independently of the driver, a needle carrier mounted between one of the brackets and the awl driver and held against lateral movement by the awl driver and said bracket, means for moving the pin longitudinally in opposite directions, and means for oscillating the awl driver.

11. A sewing machine, having, in combination, stitch forming devices including a curved hook needle, a curved awl, an awl carrier, a pivot pin for the awl carrier rigid therewith, means for oscillating the awl carrier, fixed brackets at opposite sides of the awl carrier provided with bearings for the pin, a needle carrier journaled on one of the brackets between the bracket and the awl carrier, a needle guide, a needle guide carrier mounted upon the hub of the needle carrier, and means for moving the pin longitudinally in opposite directions.

12. A sewing machine, having, in combination, a device for engaging and feeding the work, means for projecting said device through and withdrawing it from the work, mechanism acting in timed relation to said means for reciprocating said device in the direction of feed comprising a toggle, connecting mechanism between said device and one of the members of said toggle, and a pivoted toggle adjusting member pivotally connected with the other member of said toggle, a pivot stud about which said toggle adjusting members is arranged for angular adjustment, the axis of which is in substantial alinement with the axis of the central joint of the toggle at one point in the work feeding movement of said device, and means for reciprocating the central joint of said toggle.

13. A sewing machine, having, in combination, stitch forming devices, a work feeding device, mechanism for actuating said device, means for adjusting said mechanism to vary the length of feed comprising a hand lever, a perforated gage plate coöperating with the hand lever, and an adjustable cam mounted on the hand lever to engage a pin in the perforated gage plate.

14. A wax thread lock stitch sewing machine, having, in combination, stitch forming devices including a curved hook needle, a continuously rotating loop taker, a take-up, a curved awl acting to enter the work after the take-up has operated to set the stitch, and leave the work as the needle enters the work, and continuously rotating cranks for actuating the needle, awl and take-up.

15. A wax thread lock stitch sewing machine having in combination, stitch forming devices including a curved hook needle, a loop taker, a take-up, an awl acting to enter the work after the take-up has operated to set the stitch, means for actuating the take-up and awl, and a continuously rotating crank for actuating the needle.

16. A wax thread lock stitch sewing machine, having in combination, stitch forming devices including a curved hook needle, a loop taker, a take-up, a curved awl acting to enter the work after the take-up has operated to set the stitch, means for actuating the take-up and needle, and a continuously rotating crank for actuating the awl.

17. A wax thread lock stitch sewing machine, having in combination, stitch forming devices including a curved hook needle, a loop taker, a take-up, a curved awl acting to enter the work after the take-up has operated to set the stitch, means for actuating the take-up, and continuously rotating cranks for actuating the needle and awl.

18. A wax thread lock stitch sewing machine, having in combination, stitch forming devices including a curved hook needle, a curved awl, a loop taker, a take-up, means for actuating the awl and take-up, a continuously rotating crank, and lever and link connections between the crank and needle carrier arranged to come into substantial alinement near the limit of the needle movement in one direction.

19. A wax thread lock stitch sewing machine, having in combination, stitch forming devices including a curved hook needle, a loop taker, a take-up, a curved awl acting to enter the work after the take-up has acted to set the stitch, and continuously rotating cranks for actuating the needle, awl and take-up.

20. A wax thread lockstitch sewing machine, having, in combination, stitch forming devices including a curved hook needle, a curved awl, a loop taker, a take-up, means for actuating the awl and take-up a continuously rotating crank, and connections between the crank and needle, acting to impart an idle forward and backward movement to the needle near the limit of its backward stroke.

21. A wax thread lock stitch sewing machine, having, in combination, stitch forming devices including a curved hook needle, a curved awl, a loop taker, a take-up, means for actuating the take-up and needle, a continuously rotating crank, and connection between the crank and awl acting to impart an idle forward and backward movement to the awl near the limit of its backward stroke.

22. A wax thread lock stitch sewing machine, having, in combination, stitch forming devices including a curved hook needle, a curved awl, a loop taker, a take-up, continuously rotating cranks, and lever and link connections between the cranks and the needle and awl.

23. A wax thread lock stitch sewing machine, having, in combination, stitch forming devices including a curved hook needle, an oscillating needle carrier, a loop taker, a take-up, a continuously rotating crank, a bell crank, a link connecting the crank and one arm of the bell crank, and a link connecting the other arm of the bell crank and the needle carrier.

24. A wax thread lock stitch sewing machine, having, in combination, stitch forming devices including a curved hook needle, a curved awl, an oscillating awl carrier, a loop taker, a take-up, a continuously rotating crank, and connections for oscillating the awl carrier from the crank including a plurality of pivoted levers, a link connecting the levers, and link connections between the levers and the crank and awl carrier.

25. A wax thread lock stitch sewing machine, having, in combination, stitch forming devices including a curved hook needle, a bobbin case, a rotary loop taking hook acting to twist the loop of needle thread and pass it around the bobbin case, and a needle guide provided with a lateral extension to prevent the loop from catching on the guide.

26. A wax thread lock stitch sewing machine, having, in combination, stitch forming devices including a curved hook needle, a bobbin case, a rotary loop taking hook acting to twist a loop of needle thread and pass it around the bobbin case, a take-up, and a loop guiding finger located at one side of the hook and projecting in proximity to the path of motion of the needle.

27. A wax thread lock stitch sole sewing machine, having, in combination, stitch forming devices including a curved hook needle, a work table to support the sole of a shoe, a take-up, and a loop taker supported on the same side of the work table as the needle above and in front of the needle, and operating in a plane parallel to the axis of the needle movement and extending obliquely backward from the work table over the needle.

28. A wax thread lock stitch sewing machine having, in combination, stitch forming devices including a curved hook needle, a work support, a take-up, a bobbin case, and a rotary loop taking hook rotating in one direction only and operating in a plane substantially parallel to the axis of the needle movement and having its inner free end directed toward the needle.

29. A wax thread lock stitch sewing machine, having, in combination, stitch forming devices including a curved hook needle, a work support, a take-up, a bobbin case having an inner closed end directed toward the needle, and a rotary loop taking hook in which the bobbin case is supported rotating in one direction only and having its inner end unobstructed and provided with a loop taking beak directed toward the needle.

30. A wax thread lock stitch sewing machine, having, in combination, stitch forming devices including a curved hook needle, a work support, a take-up, a bobbin case having a closed inner end directed toward the needle and provided with an open outer end, and a rotary loop taking hook supporting the bobbin case and provided with an open outer end concentric with the outer end of the bobbin case whereby a bobbin can be inserted and removed through the outer end of the hook.

31. A wax thread lock stitch sewing machine, having, in combination, stitch forming devices including a curved hook needle, a work support, a take-up a bobbin case having its inner end directed toward the needle and located in front of the needle in a plane parallel to the axis of the needle movement and extending obliquely backward from the work support over the needle, and a rotary hook supporting the bobbin case provided with a loop taking beak directed toward the needle.

32. A wax thread lock stitch sewing machine, having, in combination, stitch forming devices including a curved hook needle, a work support, a take-up, a bobbin case, a rotary hook supporting the bobbin case and provided with a loop taking beak directed toward the needle, a support for the hook, locking devices mounted in the hook support and arranged to engage the bobbin case and hold it from rotation, and means carried by the hook for actuating the locking devices to permit the passage of the loop about the case.

33. A wax thread lock stitch sewing machine, having in combination, stitch forming devices including a curved hook needle, a work support, a take-up, a bobbin case, a rotary loop taking hook operating in a plane substantially parallel to the axis of the needle movement and provided with a loop taking beak directed toward the needle and a shoulder on the periphery of the hook extending obliquely inward from the throat at the base of the beak to the inner end of the hook.

34. A wax thread lock stitch sewing machine, having, in combination, stitch forming devices including a curved hook needle, a work support, a take-up, a bobbin case having its inner end closed and directed toward the needle, a loop taking hook to carry the loop around the bobbin case, and a manually operable bobbin ejecting device arranged to operate through an opening in the closed end of the bobbin case.

35. A wax thread sewing machine, having, in combination, stitch forming devices including a hook needle, a looper, mechanism for actuating the looper comprising a longitudinally moving and oscillating link upon which the looper is mounted, a cam-actuated lever having its pivot at right angles to the plane of oscillation of the link pivotally connected to one end of the link to move the link longitudinally and a second cam-actuated lever having a link connection with the other end of the link to oscillate the link.

36. A wax thread lock stitch sewing machine, having, in combination, stitch forming devices including a curved hook needle, a loop taker, a loop spreader, a cam-actuated lever upon which the spreader is pivotally mounted, and a second cam-actuated lever connected to the spreader and acting to oscillate the spreader on the first mentioned lever.

37. A wax thread lock stitch sewing machine, having, in combination, stitch forming devices including a curved hook needle, a rotary loop taking hook provided with a loop taking beak directed toward the needle, and with a shoulder extending obliquely inward from the throat at the base of the beak to the inner end of the hook, a loop spreader, and means for moving the spreader into and out of the path of movement of said shoulder to present the loop of needle thread to the beak of the hook.

38. A wax thread lock stitch sewing machine, having, in combination, stitch forming devices including a hook needle, a stationary bobbin case having a closed inner end provided with an opening connected by a slot to an opening in the side of the case, whereby the bobbin case may be threaded before the bobbin is inserted in the case, and a rotary loop taking hook to carry the loop of needle thread over the bobbin case.

39. A wax thread lock stitch sewing machine, having, in combination, stitch forming devices including a hook needle, a rotary loop taking hook, a stationary bobbin case provided with a peripheral flange engaging a supporting groove in the rotary hook, said flange being interrupted to form an abutment for the loop of thread and prevent the thread from being caught between the flange and the supporting groove of the hook, and being provided back of the abutment with a thread-cutting notch, the said hook being provided with a slot extending transversely of the supporting groove to coöperate with said thread-cutting notch.

40. In a sewing machine, the combination with the main shaft, an actuating crank or eccentric fixed thereon, a reciprocating needle, and a needle operating rock-shaft, of a crank-arm fixed upon said rock-shaft, a pitman connection between said crank-arm and the needle and adapted to assume a position in alinement with said crank-arm in the operative thrust of the needle, and an operative connection between said crank or eccentric and rock-shaft including means for effecting a slower reversal of movement of the rock-shaft substantially during the alinement of said crank-arm and pitman than at the opposite extremity of the movement of said rock-shaft.

41. In a sewing machine, the combination with the main-shaft, an actuating crank or eccentric fixed thereon, and a reciprocating needle, of a to-and-fro moving driving element, a connection between said crank or eccentric and said driving element for imparting to the latter its operative movements with a longer period of dwell in the reversal of movement at one than at the other end of its traverse, and a dwell-producing crank-and-pitman connection including a toggle device between said driving element and the needle from which the latter derives reciprocatory movements with a period of dwell at one end of its traverse aggregating those of the two dwells of its operative connections with the actuating crank or eccentric.

42. In a sewing machine, in combination, a curved work-penetrating and feeding element, an oscillating carrier therefor, means for imparting feed-movements to said carrier and implement, and means for oscillating the said carrier and implement comprising a crank, a lever in operative connection with the said crank, an arm in connection with said carrier, and a link connecting said lever with said arm, the parts being combined and arranged so that the center of pivotal connection between the lever and the corresponding end of the link shall arrive in line or approximately so with the center on which the lever oscillates and the center or point of connection between the link and arm, whereby a dwell of the said implement in its extreme position during the feeding movement is produced.

43. A wax thread lock stitch sewing machine, having in combination, a hook needle, a loop taker, an oscillating main take-up arm, a continuously rotating crank for actuating the take-up arm, a spring-pressed auxiliary take-up continuously engaging the thread, and mechanism for positively moving the auxiliary take-up to coöperate with the main take-up in controlling the thread.

44. A wax thread lock stitch sewing machine, having in combination, stitch forming devices including a hook needle, a thread arm, a looper, a loop taker, an oscillating take-up arm, a continuously rotating crank for actuating the take-up arm, a slack thread controlling device continuously engaging the thread mounted independently of the take-up arm, and means for positively actuating said device to coöperate with the take-up arm in controlling the thread.

45. A wax thread lock stitch sewing machine, having in combination, stitch forming devices including a hook needle, a loop taker, an oscillating main take-up arm, a continuously rotating crank for actuating said arm, an auxiliary take-up, and means for positively moving the auxiliary take-up to relieve the tension on the thread as the loop on the loop taker reaches its position of greatest loop extension.

46. A wax thread lock stitch sewing machine, having in combination, stitch forming devices including a hook needle, a thread arm, a looper, a loop taker, an oscillating main take-up arm, a continuously rotating crank for actuating said arm, an auxiliary take-up, and means for positively moving the auxiliary take-up while the thread is engaged by the main take-up to supply thread for the formation of the thread arm loop.

47. A wax thread lock stitch sewing machine, having in combination, stitch forming devices including a hook needle, a loop taker, an oscillating main take-up arm, a continuously rotating crank for actuating said arm to set the stitch and to give up thread, an auxiliary take-up, and means for positively actuating the auxiliary take-up to coöperate with the main take-up in controlling the thread during the thread delivery movement of the main take-up arm.

48. A wax thread lock stitch sewing machine, having in combination, stitch forming devices including a hook needle, a loop taker, a thread arm, an oscillating main take-up arm, a continuously rotating crank for actuating the take-up arm to set the stitch and give up thread, an auxiliary take-up, and mechanism for positively moving the auxiliary take-up in one direction to supply thread for the thread arm loop and for moving the auxiliary take-up in the opposite direction to take up the excess of thread given up by the main take-up arm.

49. A wax thread lock stitch sewing machine, having in combination, stitch forming devices including a hook needle, a loop taker, a thread arm, an oscillating main take-up arm, a continuously rotating crank for actuating the take-up arm to set the stitch and give up thread, an auxiliary take-up and mechanism for positively moving the auxiliary take-up to take up the excess of thread given up by the main take-up arm.

FRED ASHWORTH.

Witnesses:
  FRED O. FISH,
  MARGARET L. GILMAN.

It is hereby certified that in Letters Patent No. 1,169,909, granted February 1, 1916, upon the application of Fred Ashworth, of Beverly, Massachusetts for an improvement in "Sewing-Machines," errors appear in the printed specification requiring correction as follows: Page 7, line 20, for the word "hooks" read *hook;* page 15, line 119, claim 12, for the word "members" read *member;* page 16, line 63, claim 20, and page 17, line 40, claim 31, after the compound word "take-up" insert a comma; page 16, line 74, claim 21, for the word "connection" read *connections;* and that the said Letters Patent should be read with these corrections therein that the same may conform to the record of the case in the Patent Office.

Signed and sealed this 7th day of March, A. D., 1916.

[SEAL.]                                         J. T. NEWTON,

Cl. 112–20.                                  *Acting Commissioner of Patents.*